United States Patent
Komatsu et al.

(10) Patent No.: US 12,059,750 B2
(45) Date of Patent: Aug. 13, 2024

(54) LASER PROCESSING MACHINE, LASER PROCESSING METHOD, AND PROCESSING PROGRAM GENERATION DEVICE

(71) Applicant: Amada Co., Ltd., Kanagawa (JP)

(72) Inventors: Takayuki Komatsu, Kanagawa (JP); Kazuhisa Nogi, Kanagawa (JP); Noboru Kikkawa, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 892 days.

(21) Appl. No.: 17/042,100

(22) PCT Filed: Mar. 20, 2019

(86) PCT No.: PCT/JP2019/011810
§ 371 (c)(1),
(2) Date: Sep. 26, 2020

(87) PCT Pub. No.: WO2019/188694
PCT Pub. Date: Oct. 3, 2019

(65) Prior Publication Data
US 2021/0237207 A1     Aug. 5, 2021

(30) Foreign Application Priority Data
Mar. 28, 2018 (JP) .................. 2018-061658

(51) Int. Cl.
*B23K 26/38* (2014.01)
*B23K 26/08* (2014.01)
(Continued)

(52) U.S. Cl.
CPC .......... *B23K 26/38* (2013.01); *B23K 26/0876* (2013.01); *G05B 19/4155* (2013.01); *B23K 2101/18* (2018.08); *G05B 2219/36199* (2013.01)

(58) Field of Classification Search
CPC .... B23K 26/38; B23K 26/36; B23K 26/0876; B23K 2101/18; G05B 19/4155; G05B 2219/36199
(Continued)

(56) References Cited

U.S. PATENT DOCUMENTS

2012/0109352 A1\* 5/2012 Himeno ........... G05B 19/40932
700/103

FOREIGN PATENT DOCUMENTS

JP   10-244394 A   9/1998
JP   11-192572 A   7/1999
(Continued)

OTHER PUBLICATIONS

International Search Report for corresponding Application No. PCT/JP2019/011810, mailed Jun. 18, 2019.
(Continued)

*Primary Examiner* — Nathaniel E Wiehe
*Assistant Examiner* — Alba T Rosario-Aponte
(74) *Attorney, Agent, or Firm* — Renner, Otto, Boisselle & Sklar, LLP

(57) ABSTRACT

An NC device controls a processing machine body so as to form an opening by cutting the periphery of an opening forming area in a material. In a case where a skid interferes with the opening forming area and the interfering skid is positioned within a margin from a first gravity center of the opening forming area in an alignment direction of the skid, the NC device controls the processing machine body so as to cut the opening forming area with a dividing line set at a position that is apart by a predetermined distance from the skid in the alignment direction of the skid. The predetermined distance is a distance in which the material is not welded to the skid, and is a distance in which a second
(Continued)

gravity center of a scrap interfering with the skid is positioned at a distance longer than the margin from the skid.

4 Claims, 24 Drawing Sheets

(51) Int. Cl.
  *B23K 101/18* (2006.01)
  *G05B 19/4155* (2006.01)
(58) Field of Classification Search
  USPC .............................. 219/121.72, 121.67, 121.6
  See application file for complete search history.

(56) References Cited

FOREIGN PATENT DOCUMENTS

| JP | 2007-319893 A |   | 12/2007 |
|----|---------------|---|---------|
| JP | 2015-100828 A |   | 6/2015  |
| JP | 2016-78063 A  |   | 5/2016  |
| JP | 2016078063 A  | * | 5/2016  |
| JP | 2016170504 A  | * | 9/2016  |
| KR | 20150068615 A | * | 6/2015  |

OTHER PUBLICATIONS

Written Opinion for corresponding Application No. PCT/JP2019/011810, mailed Jun. 18, 2019.

* cited by examiner

LASER PROCESSING MACHINE, LASER PROCESSING METHOD, AND PROCESSING PROGRAM GENERATION DEVICE

TECHNICAL FIELD

The present disclosure relates to a laser processing machine, a laser processing method, and a processing program generation device.

BACKGROUND ART

A laser processing machine cuts a sheet metal by irradiating the sheet metal placed on a table in which a plurality of skids are aligned with a laser beam cuts parts each having a predetermined shape out of the sheet metal. In a case where the part is formed with an opening therein, the laser processing machine firstly cuts the periphery of an opening forming area formed with an opening and thereafter cuts the periphery of the part. A portion that should be cut and removed from the part is referred to as a scrap. The part is held on the table and the scrap is caused to be fallen off downward from between the skids (see Patent Literature 1).

In a case where a length of the scrap is longer than an interval between two adjacent skids, the scrap does not fall off from between the skids. Therefore, the laser processing machine divides the opening forming area (the scrap) into equal parts to be fallen off downward.

CITATION LIST

Patent Literature

[Patent Literature 1]: Japanese Unexamined Patent Application Publication No. 2016-78063

SUMMARY OF THE INVENTION

A conventional laser processing machine sets a dividing line without considering a position of a skid and divides an opening forming area. Accordingly, in a case where the dividing line is proximate to the skid, the cut scrap is welded to the skid and the scrap does not fall off sometimes. In a case where the dividing line is proximate to the skid, the skid is fused and is abraded. In a case where a gravity center of the cut scrap is proximate to the skid, the cut scrap remains on the skid and sometimes does not fall off.

An object of an embodiment is to provide a laser processing machine, a laser processing method, and a processing program generation device that can increase the possibility of falling off of the scrap from between skids, and can reduce a degree of abrasion of the skid.

A first aspect of an embodiment provides a laser processing machine including: a processing machine body including a table in which a plurality of skids are aligned, configured to cut a material by irradiating the material placed on the skids with a laser beam; and a control device configured to control the processing machine body such that an opening is formed by cutting the periphery of an opening forming area set at an inside of the material; wherein in a case where a skid interferes with the opening forming area and the interfering skid is positioned within a predetermined margin from a first gravity center of the opening forming area in an alignment direction of the plurality of skids; the control device controls the processing machine body such that the opening forming area is cut with a dividing line set at a position that is apart from the skid by a predetermined distance in the alignment direction; the predetermined distance is a distance in which the material is not welded to the skid in a case where the opening forming area is cut with the dividing line; and the predetermined distance is, in a case where among a plurality of scraps formed by cutting the opening forming area with the dividing line and by cutting the periphery of the opening forming area, a scrap interfering with the skid is defined as a first scrap, and a scrap not interfering with the skid is defined as a second scrap, a distance in which a second gravity center of the first scrap is positioned at a distance longer than the margin from the skid.

A second aspect of an embodiment provides a laser processing machine including: a processing machine body including a table in which a plurality of skids are aligned configured to cut a material by irradiating the material placed on the skids with a laser beam; and a control device configured to control the processing machine body such that an opening is formed by cutting the periphery of an opening forming area set at an inside of the material; wherein in a case where, by assuming n is an integer of two or more, n skids interfere with the opening forming area, the control device controls the processing machine body such that the opening forming area is cut with at least (n−1) dividing line set in the opening forming area; a position of the (n−1) dividing line is a position in which the material is not welded to the n skids in a case where the opening forming area is cut with the dividing line; and the position of the (n−1) dividing line is a position in which, among a plurality of scraps formed by cutting the opening forming area with the dividing line and by cutting the periphery of the opening forming area, a gravity center of a scrap interfering with the n skids is positioned at a distance longer than a predetermined margin from the n skids in an alignment direction of the plurality of skids.

A third aspect of an embodiment provides a laser processing method including: in a case where a skid interferes with an opening forming area set at an inside of a material and the interfering skid is positioned within a predetermined margin from a first gravity center of the opening forming area in an alignment direction of a plurality of skids; dividing the opening forming area into a plurality of scraps by cutting the opening forming area with a dividing line set at a position that is apart from the skid by a predetermined distance in the alignment direction and by cutting the periphery of the opening forming area, which dividing is performed by a laser processing machine including a table in which the plurality of skids are aligned configured to cut the material by irradiating the material placed on the skids with a laser beam, wherein the predetermined distance is a distance in which the material is not welded to the skid in a case where the opening forming area is cut with the dividing line; and the predetermined distance is a distance in which, among the plurality of scraps, in a case where a scrap interfering with the skid is defined as a first scrap and a scrap not interfering with the skid is defined as a second scrap, a second gravity center of the first scrap is positioned at a distance longer than the margin from the skid.

A fourth aspect of an embodiment provides a laser processing method including: by assuming n is an integer of two or more, in a case where n skids interfere with an opening forming area set at an inside of a material; dividing the opening forming area into a plurality of scraps by cutting the opening forming area with at least (n−1) dividing line set in the opening forming area and by cutting the periphery of the opening forming area, which dividing is performed by a laser processing machine including a table in which a plurality of skids are aligned configured to cut the material by irradiating the material placed on the skids with a laser beam, wherein a position of the (n−1) dividing line is a position in which the material is not welded to the n skids in a case where the opening forming area is cut with the dividing line; and the position of the (n−1) dividing line is a position in which, among the plurality of scraps, a gravity center of a scrap interfering with the n skids is positioned at a distance longer than a predetermined margin from the n skids in an alignment direction of the plurality of skids.

A fifth aspect of an embodiment provides a processing program generation device, including: an interference determiner configured to determine the number of skid interfering with an opening forming area in a case where an opening is formed by cutting the periphery of the opening forming area set at an inside of a material placed on a plurality of skids aligned in a table of a laser processing machine; a gravity center calculator configured to calculate a first gravity center of the opening forming area; a proximity determiner configured to determine whether the interfering skid is positioned within a predetermined margin from the first gravity center in an alignment direction of the plurality of skids and is in a proximity state; a dividing line setter configured to set a dividing line to a position that is apart by a predetermined distance from a skid in the opening forming area in the alignment direction in a case where it is determined by the interference determiner that the skid interferes with the opening forming area and determined by the proximity determiner that the skid is in the proximity state; and an NC data generator configured to generate NC data necessary for an NC device to control the laser processing machine such that the laser processing machine forms an opening at an inside of the material by cutting the opening forming area with the dividing line and by cutting the periphery of the opening forming area; wherein the dividing line setter: sets the predetermined distance to a distance in which the material is not welded to the skid in a case where the opening forming area is cut with the dividing line; and sets the predetermined distance to a distance in which, among a plurality of scraps formed by cutting the opening forming area with the dividing line and by cutting the periphery of the opening forming area, in a case where a scrap interfering with the skid is defined as a first scrap and a scrap not interfering with the skid is defined as a second scrap, a second gravity center of the first scrap is positioned at a distance longer than the margin from the skid.

A sixth aspect of an embodiment provides a processing program generation device including: an interference determiner configured to determine the number of skid interfering with the opening forming area in a case where an opening is formed by cutting the periphery of the opening forming area set at an inside of a material placed on a plurality of skids aligned in a table of a laser processing machine; a dividing line setter configured to set at least the (n−1) dividing line within the opening forming area in a case where, by assuming n is an integer of two or more, it is determined by the interference determiner that n skids interfere with the opening forming area; and an NC data generator configured to generate NC data necessary for an NC device to control the laser processing machine such that the laser processing machine forms an opening at an inside of the material by cutting the opening forming area with the dividing line and by cutting the periphery of the opening forming area; wherein the dividing line setter: sets a position of the (n−1) dividing line to a position in which the material is not welded to the skid in a case where the opening forming area is cut with the dividing line; and sets the position of the (n−1) dividing line to a position in which, among a plurality of scraps formed by cutting the opening forming area with the dividing line and by cutting the periphery of the opening forming area, a first gravity center of a scrap interfering with the skid is positioned at a distance longer than a predetermined margin from the skid in an alignment direction of the plurality of skids.

In accordance with a laser processing machine, a laser processing method, and a processing program generation device according to an embodiment, it is possible to increase the possibility of falling off of a scrap from between skids and to reduce a degree of abrasion of the skid.

MODES FOR CARRYING OUT THE INVENTION

A laser processing machine, a laser processing method, and a processing program generation device according to an embodiment are described below with reference to accompanying drawings.

Figure 1:
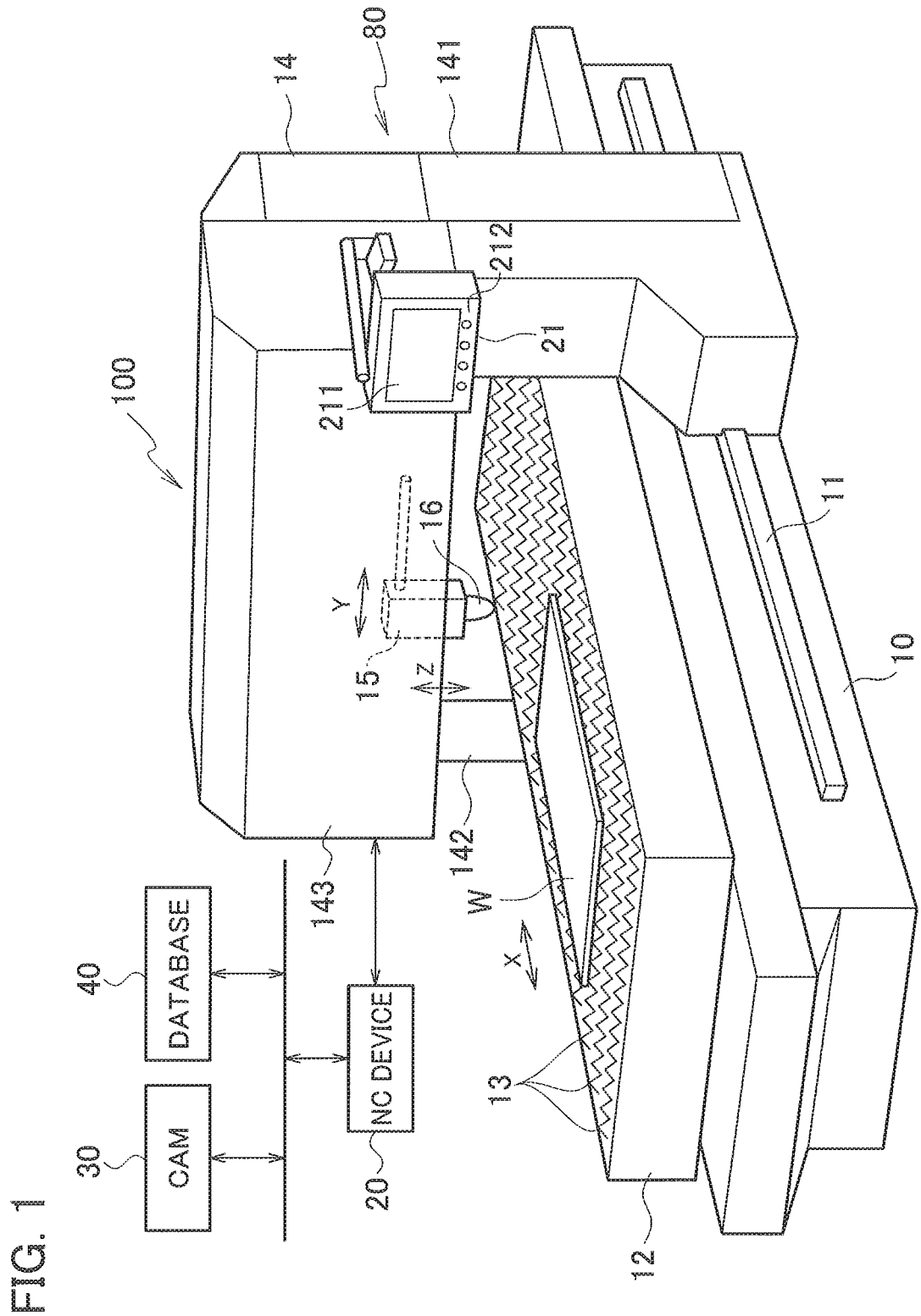
FIG. 1 is a diagram illustrating an example of an entire configuration of a laser processing machine according to an embodiment.
Figure 2:
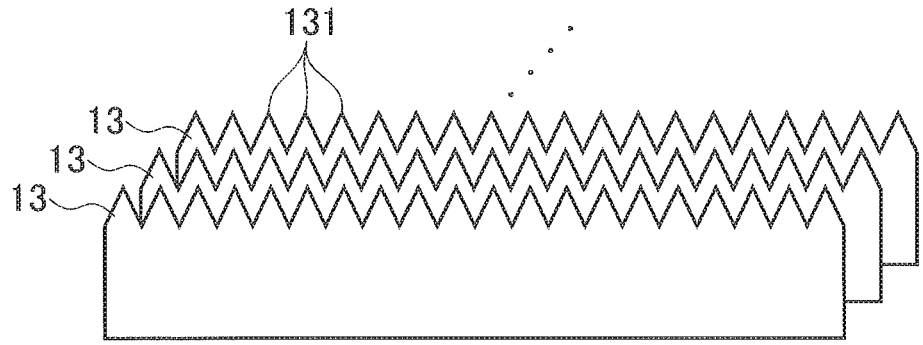
FIG. 2 is a perspective view illustrating skids aligned in a table of a laser processing machine according to an embodiment.

With reference to FIG. 1, an example of an entire configuration of a laser processing machine 100 according to an embodiment is described. In FIG. 1, on a base 10, a table 12 for placing thereon a sheet metal W that is a processing target material is provided. In a table 12, a plurality of skids 13 made of iron plates, for example, are aligned in the X-direction. As illustrated in FIG. 2, to upper end portions of the skids 13, a plurality of triangle-shaped projections 131 are formed. Accordingly, the sheet metal W is supported by the plurality of projections 131.

The laser processing machine 100 includes a gate type frame 14 arranged in a manner to straddle the table 12. The frame 14 includes side frames 141 and 142, and an upper frame 143. The frame 14 is configured to move in the X-direction along a rail 11 in the X-direction formed to a side surface of the base 10.

In the upper frame 143, a carriage 15 that is movable in the Y-direction is provided. A carriage 15 is attached with a laser head 16 that emits a laser beam. By the frame 14 moving in the X-direction and the carriage 15 moving in the Y-direction, the laser head 16 is configured to move in any direction, an X-direction, and/or a Y-direction above the sheet metal W. The laser head 16 is configured to be movable also in the Z-direction. In a case where the laser head 16 moves above the sheet metal W, the laser head 16 is controlled to keep an interval with the sheet metal W to a predetermined distance.

A processing machine body 80 is constituted from the base 10, the table 12 in which the skids 13 are aligned, the frame 14, and the carriage 15 attached with the laser head 16. An NC device 20 controls the processing machine body 80.

The NC device 20 is an example of a control device that controls the processing machine body 80. The NC device 20 is configured as a part of the laser processing machine 100 in this diagram, but the NC device 20 may be an external device of the laser processing machine 100.

The frame 14 is attached with an operation pendant 21 connected with the NC device 20. The operation pendant 21 includes a display 211 and an operation unit 212. The display 211 displays various pieces of information. By an operator operating the operation unit 212, the operation pendant 21 supplies, to the NC device 20, various types of instruction signals.

The NC device 20 is connected with, via the network, a computing device 30 that causes the CAM (Computer Aided Manufacturing) that is software to be operated and a database 40. Hereinafter, the computing device 30 is referred to as a CAM device 30. The CAM device 30 generates a processing program for controlling the laser processing machine 100 and supplies it to the NC device 20 or the database 40. The NC device 20 controls the laser processing machine 100 based on the processing program. The database 40 stores various pieces of data necessary for generating the processing program.

The laser processing machine 100 configured as above, while moving the laser head 16 in the X-direction or the Y-direction, irradiates the sheet metal W with a laser beam to cut the sheet metal W and cuts one or more parts out of the sheet metal W. In accordance with the irradiation of the sheet metal W with the laser beam, assist gas is jetted onto the sheet metal W. In FIG. 1, the illustration of a configuration of jetting of the assist gas is omitted.

In a case where an opening is formed inside a part cut out of the sheet metal W, the laser processing machine 100 cuts the periphery of an opening forming area set inside the part. After the periphery of the opening forming area is cut, the opening forming area cut off from the part becomes a scrap. As described later, in a case where the skids 13 interfere with the opening forming area (the scrap), by considering positions of the skids 13, the laser processing machine 100 sometimes divides the opening forming area. The interference of the skids 13 with the opening forming area means that the opening forming area is not positioned between two adjacent skids 13 and that the skid 13 is positioned at any position between one end portion and the other end portion of the opening forming area.

Figure 3:
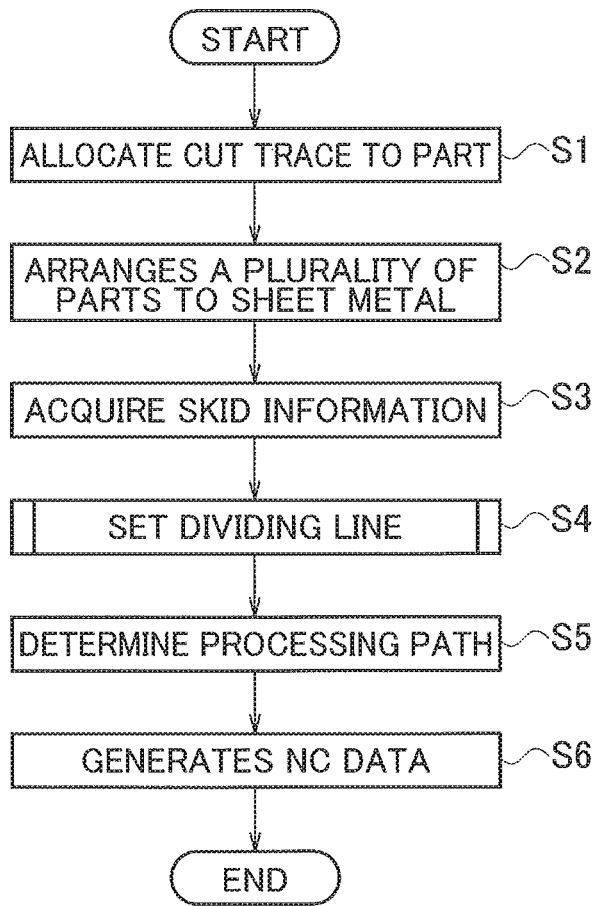
FIG. 3 is a flowchart illustrating a broad outline of a processing program generation method.
Figure 4:
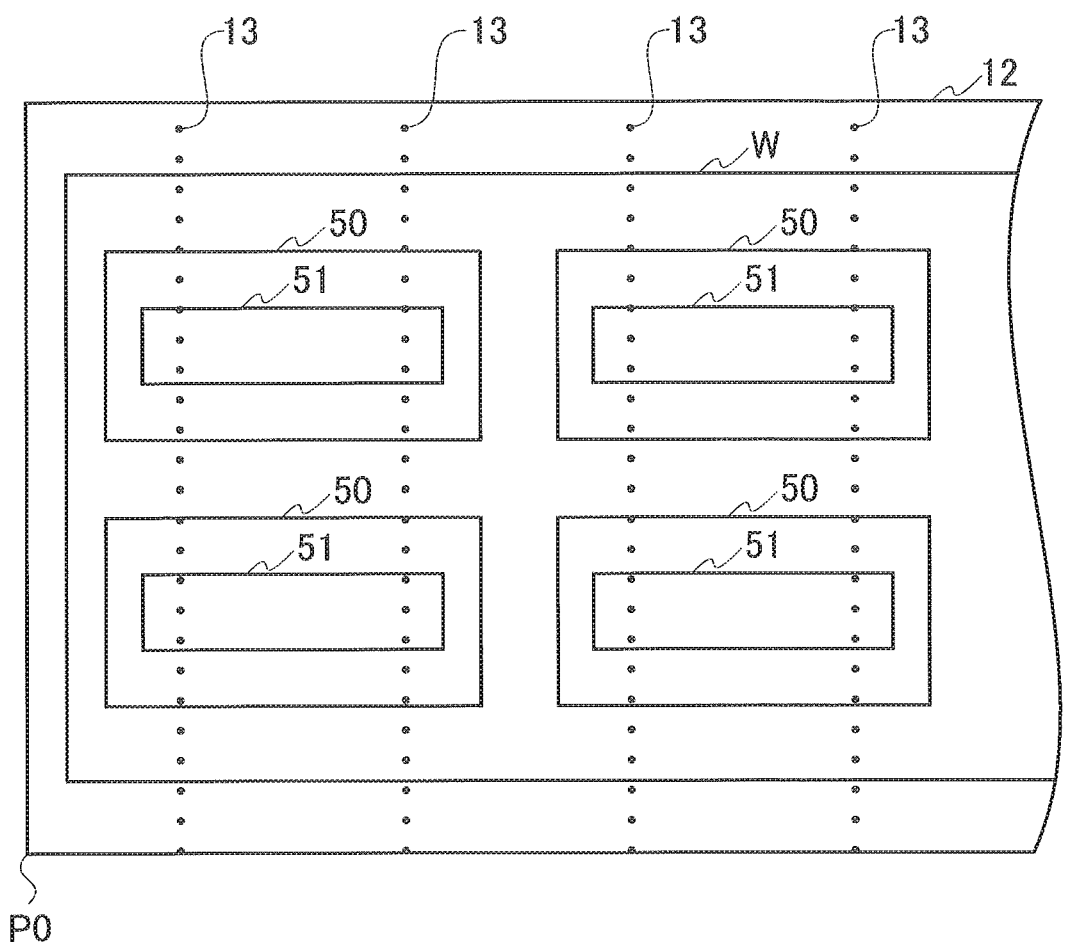
FIG. 4 is a schematic view illustrating a state in which a sheet metal is arranged on a table of a laser processing machine to cut a plurality of parts out of the sheet metal.

With reference to FIG. 3 and FIG. 4, a broad outline of a method for generating the processing program by the CAM device 30 that operates as the processing program generation device according to an embodiment is described. As illustrated in FIG. 4, a case of generating the processing program for cutting a plurality of parts 50 out of the sheet metal W placed on the table 12 is taken as an example. An opening forming area 51 for forming a rectangular opening is formed inside of the part 50.

In FIG. 3, after a process of generating the processing program starts, the CAM device 30 allocates a cut trace (a cut path) by a laser beam to the part 50 in step S1. This is referred to as the automatic allocation. Graphic data (CAD data) of the part 50 is generated by the unillustrated CAD and is stored in the database 40. The CAM device 30 reads, from the database 40, the graphic data of the part 50, and performs processes of the automatic allocation. The CAM device 30 may have functions of the CAD that is software. That is, the computing device 30 may be a CAD/CAM device.

In step S2, the CAM device 30 arranges pieces of graphic data of the plurality of parts 50 to graphic data showing the sheet metal W. This is referred to as the automatic blank layout. The graphic data of the sheet metal W is stored in the database 40. The CAM device 30 reads, from the database 40, the graphic data of the sheet metal W and performs the processes of the automatic blank layout. The number of parts 50 arranged on the sheet metal W may be automatically set or may be manually set by an operator.

In step S3, the CAM device 30 acquires, from the database 40, skid information indicating how the skids 13 are arranged. With an origin position PO of the table 12 illustrated in FIG. 4 as a reference, the skid information indicates to which position the skid 13 is arranged. The skid information includes interval information between two adjacent skids 13. In a case where it is necessary to divide the opening forming area 51, the CAM device 30 sets a dividing line for dividing the opening forming area 51 in step S4. The details of step S4 are described later.

The CAM device 30, in step S5, determines a processing path for cutting the plurality of parts 50 out of the sheet metal W by irradiating the sheet metal W with a laser beam. The processing path includes a processing path for cutting the dividing line set in step S4. The CAM device 30, in step S6, generates NC data and then ends the processes of generating the processing program. The NC data is the processing program configured from a machine control code used by the NC device 20 to control the laser processing machine 100.

Figure 5:
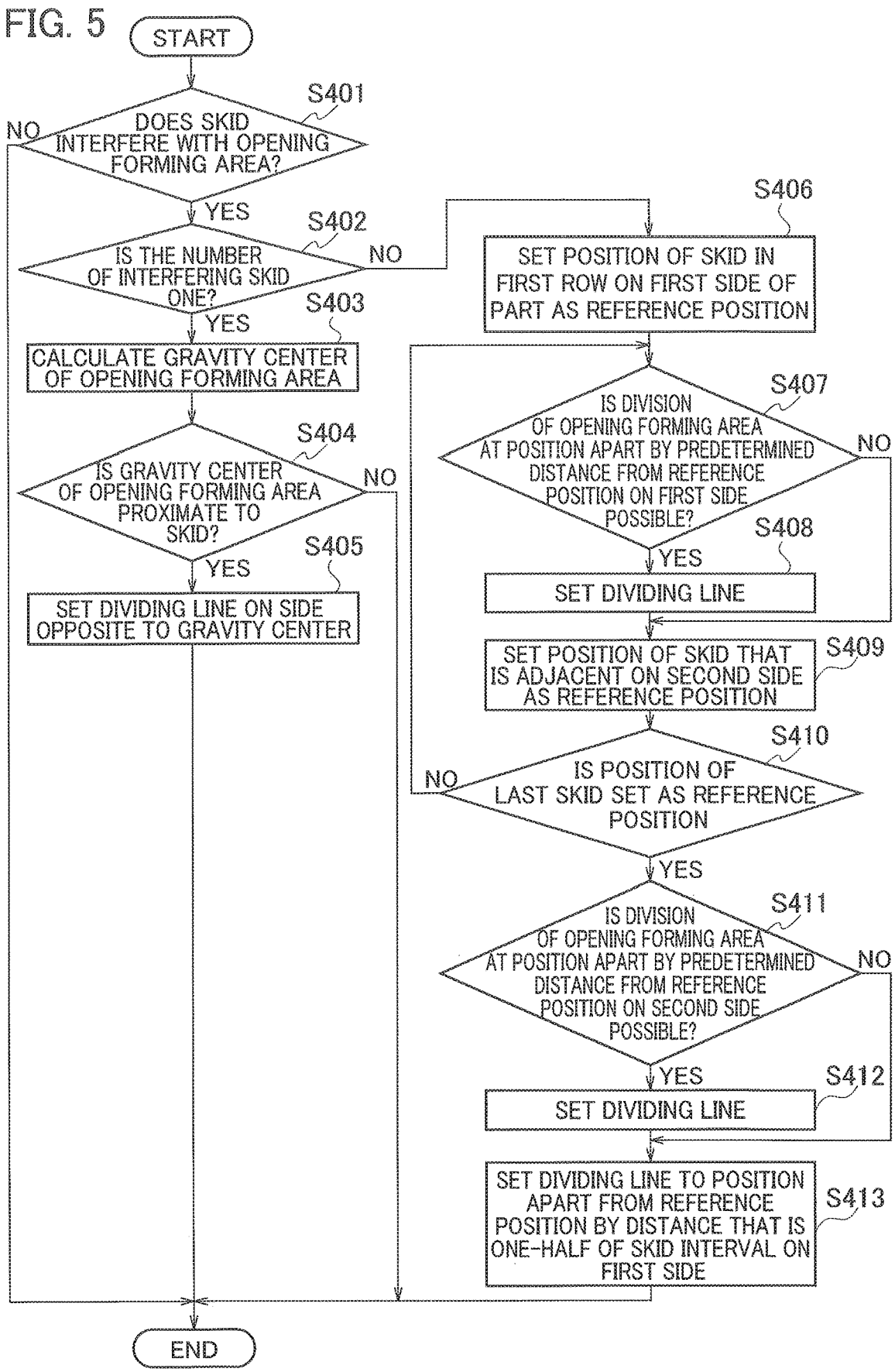
FIG. 5 is a flowchart illustrating a detail of a process of setting a dividing line in step S4 of FIG. 3.

With reference to a flowchart illustrated in FIG. 5, the details of the process for setting the dividing line in step S4 of FIG. 3 are described. In FIG. 5, the CAM device 30 determines, in step S401, whether the skids 13 interfere with the opening forming area 51. In a case where it is not determined that the skids 13 interfere with the opening forming area 51 (NO), the CAM device 30 ends the process, and alternatively, in a case where it is determined that the skids 13 interfere with the opening forming area 51 (YES), the CAM device 30 determines, in step S402, whether the number of interfering skid 13 is one.

Figure 6A:
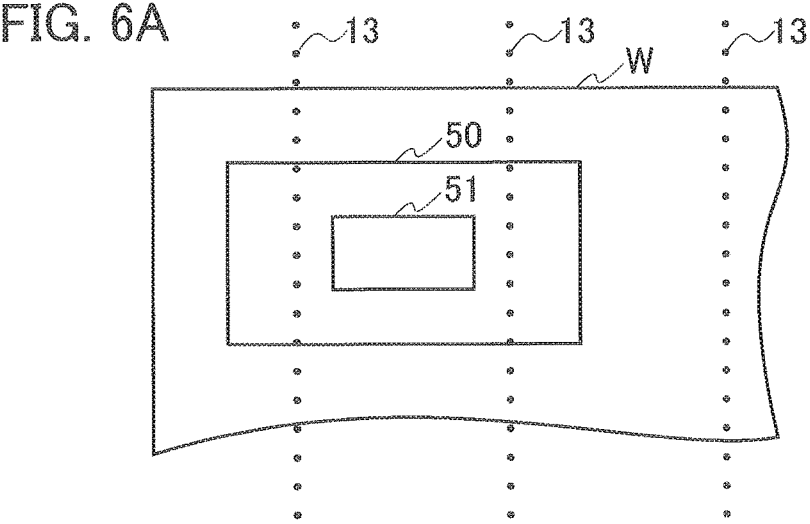
FIG. 6A is a diagram illustrating an example of case where a skid does not interfere with an opening forming area.
Figure 6B:
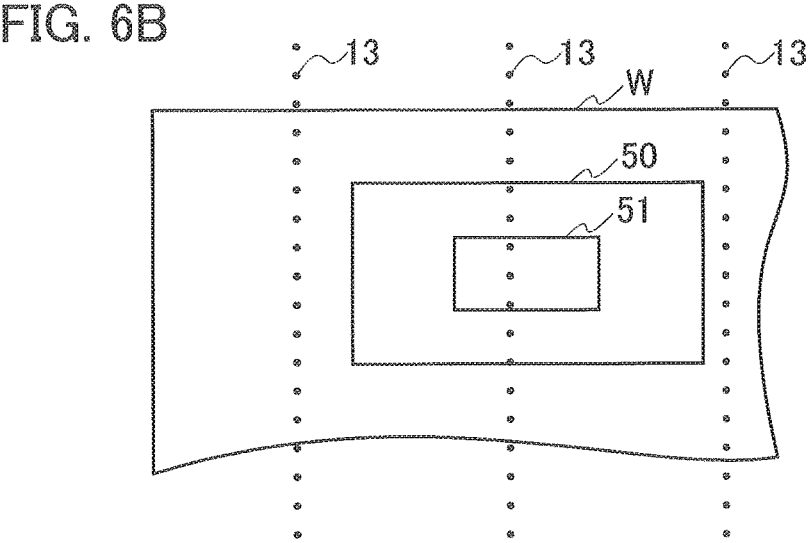
FIG. 6B is a diagram illustrating an example of a case where a skid interferes with an opening forming area.

FIG. 6A illustrates an example of a case where the skid 13 does not interfere with the opening forming area 51. In this case, in a case where the laser processing machine 100 cuts the periphery of the opening forming area 51, the opening forming area 51 becomes a scrap and is fallen off downward. FIG. 6B illustrates an example of a case where one skid 13 interferes with the opening forming area 51. In this case, in a case where the laser processing machine 100 cuts the periphery of the opening forming area 51, a scrap does not fall off sometimes depending on a position of the interfering skid 13.

Figure 6C:
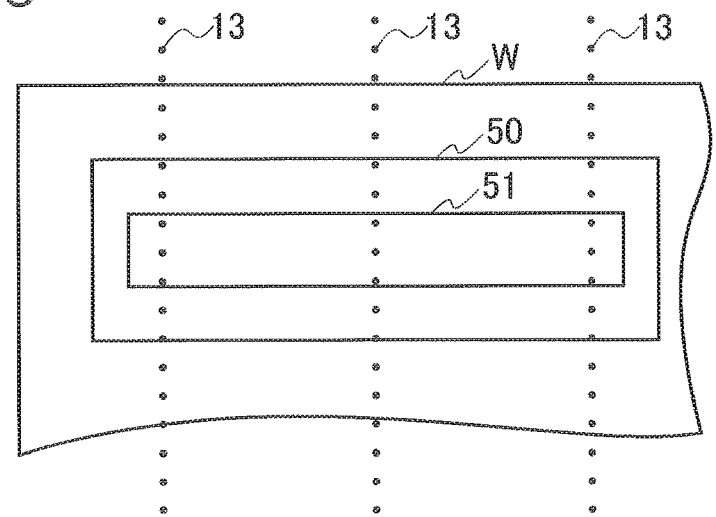
FIG. 6C is a diagram illustrating an example of a case where three skids interfere with an opening forming area.

FIG. 6C illustrates an example of a case where three skids 13 interfere with the opening forming area 51. In this case, a scrap does not fall off simply by the laser processing machine 100 cutting the periphery of the opening forming area 51.

The sheet metal W is placed at a determined position with the origin position PO of the table 12 as a reference, and is fixed by an unillustrated clamp. The CAM device 30 acquires the skid information. Accordingly, the CAM device 30 can determine, in step S401, whether the skids 13 interfere with the opening forming area 51 and can determine, in step S402, the number of interfering skids 13.

In step S402, in a case where it is determined that the number of interfering skid 13 is one (YES) as illustrated in FIG. 6B, the CAM device 30 calculates, in step S403, a gravity center (a first gravity center) of the opening forming area 51. The CAM device 30 determines, in step S404, whether the gravity center of the opening forming area 51 is proximate to the skids 13.

Figure 7A:
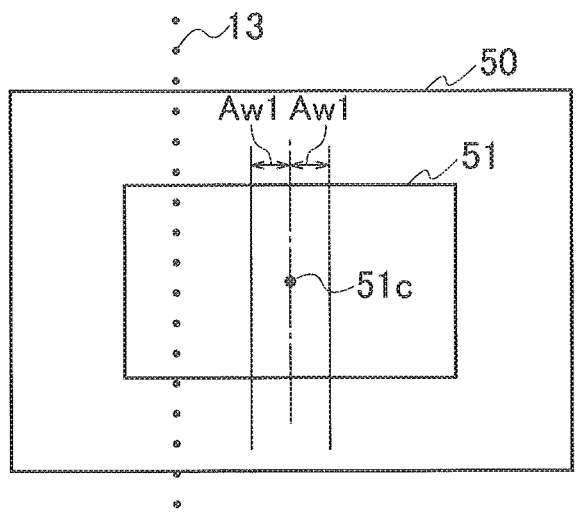
FIG. 7A is a diagram illustrating an example of a case where a gravity center of an opening forming area is not proximate to a skid.
Figure 7B:
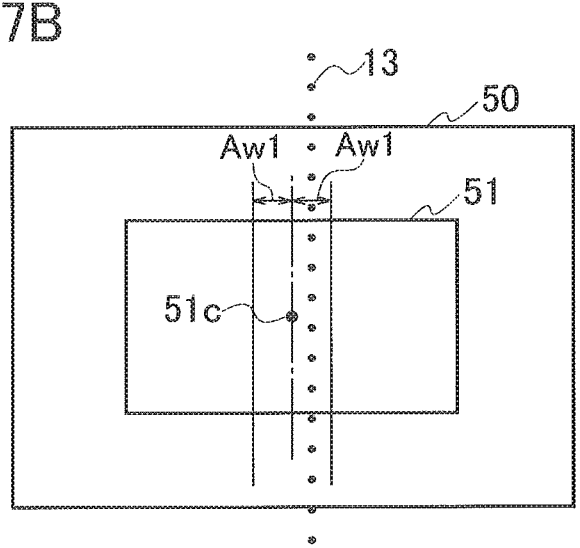
FIG. 7B is a diagram illustrating an example of a case where a gravity center of an opening forming area is proximate to a skid.

FIG. 7A illustrates an example of a case where a gravity center 51c of the opening forming area 51 is not proximate to the skid 13, and alternatively FIG. 7B illustrates an example of a case where the gravity center 51c of the opening forming area 51 is proximate to the skids 13. The CAM device 30 determines whether the gravity center 51c is proximate to the skids 13 depending on whether the skid 13 is positioned within both sides margins Aw1 from the gravity center 51c in the alignment direction of the skids 13. A distance of the margin Aw1 may be appropriately set, and the CAM device 30 may hold a set value of the margin Aw1 or an operator may set the margin Aw1.

In a case where the skid 13 is positioned within the margin Aw1, the margin Aw1 may be set to a distance in which it is possible that a scrap generated when the periphery of the opening forming area 51 is cut does not fall off. A specific distance of the margin Aw1 may be set to an appropriate distance as a design matter.

In step S404, in a case where it is not determined that the gravity center 51c is proximate to the skid 13 (NO) as illustrated in FIG. 7A, the CAM device 30 ends the process. Alternatively, in step S404, in a case where it is determined that the gravity center 51c is proximate to the skid 13 (YES) as illustrated in FIG. 7B, the CAM device 30, in step S405, sets a dividing line on the side opposite to the gravity center 51c in the alignment direction of the skids 13 across the skid 13 and ends the process. In a case where the gravity center 51c is not proximate to the skid 13, the opening forming area 51 becomes a scrap and falls off downward, and thus the division of the opening forming area 51 is not necessary.

Figure 8:
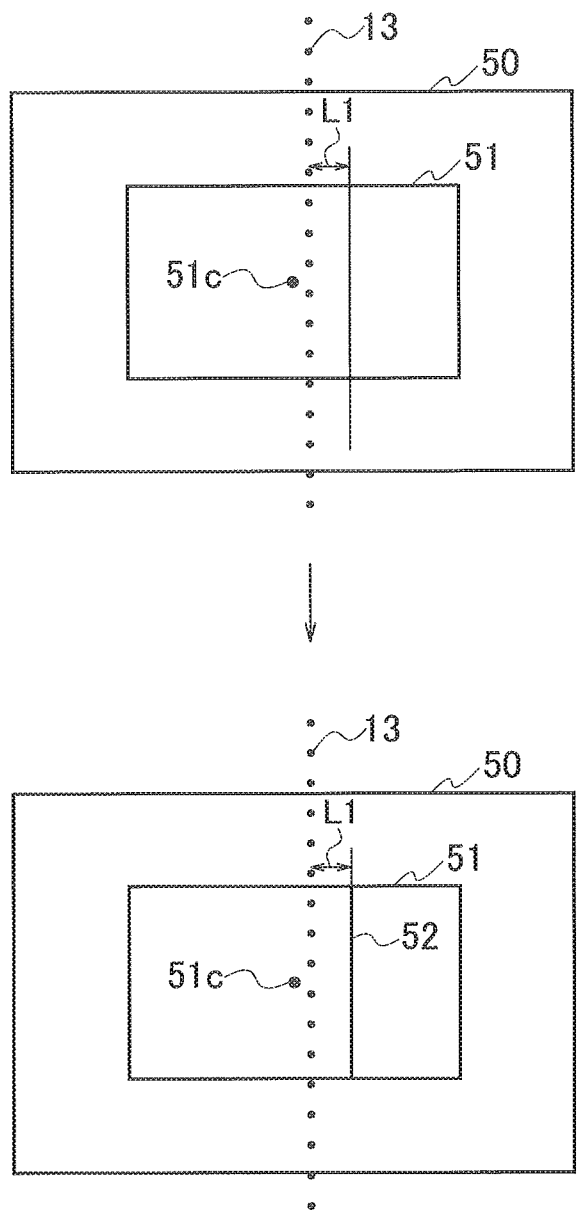
FIG. 8 is a diagram illustrating an example of a process of adding a dividing line in step S405 of FIG. 5.

FIG. 8 illustrates an example of an additional process for the dividing line in step S405. As illustrated in FIG. 8, the CAM device 30 sets a predetermined distance L1 from the skid 13 on the side opposite to the gravity center 51c across the skid 13, and sets a dividing line 52 at a position apart by the distance L1 from the skid 13. The CAM device 30 may hold a set value of the distance L1 or an operator may set the distance L1. A specific distance of the distance L1 may be set to an appropriate distance as a design matter.

In a case where the laser processing machine 100 cuts the opening forming area 51 with the dividing line 52 set in step S405, since the dividing line 52 is apart from the skid 13, the opening forming area 51 (a material of the sheet metal W) is not welded to the skid 13 and the skid 13 does not fuse.

Figure 9A:
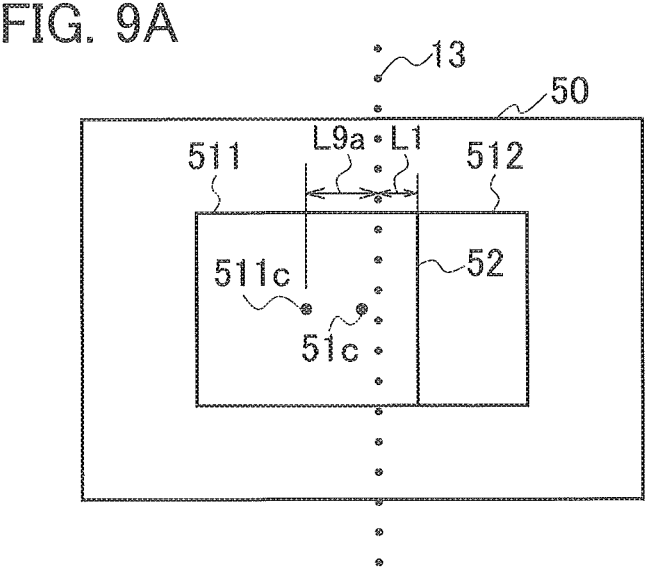
FIG. 9A is a diagram illustrating a case where a dividing line is set at a position that is apart by a predetermined distance from a skid on a side opposite to a gravity center across the skid.

The reasons why the CAM device 30 sets the dividing line 52 on the side opposite to the gravity center 51c are as follows. FIG. 9A illustrates, as similar to FIG. 8, a case where the distance L1 is set from the skid 13 on the side opposite to the gravity center 51c, and the dividing line 52 is set at a position apart by the distance L1 from the skid 13. The opening forming area 51 is divided into two areas by the dividing line 52, the opening forming area 51 on the side interfering with the skid 13 is defined as an opening forming area 511, and the opening forming area 51 on the side not interfering with the skid 13 is defined as an opening forming area 512. A distance between a gravity center 511c of the opening forming area 511 and the skid 13 is defined as a distance L9a.

After the laser processing machine 100 cuts the opening forming area 51 with the dividing line 52 and cuts the periphery of the opening forming area 51, the opening forming area 511 becomes a first scrap interfering with the skid 13 and the opening forming area 512 becomes a second scrap not interfering with the skid 13.

Figure 9B:
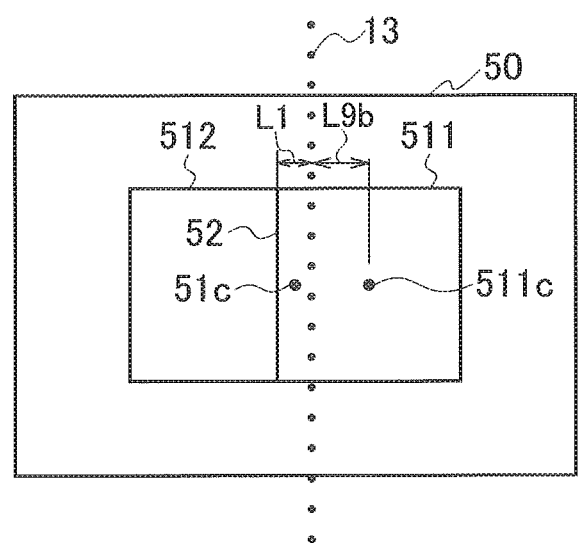
FIG. 9B is a diagram illustrating a case where a dividing line is set at a position that is apart by a predetermined distance from a skid on a side where a gravity center is positioned.

Reversely to FIG. 8, FIG. 9B illustrates a case where, on the side where the gravity center 51c is positioned, the distance L1 is set from the skid 13, and the dividing line 52 is set at a position apart by the distance L1 from the skid 13. In this case, a distance between the gravity center 511c of the opening forming area 511 and the skid 13 is defined as a distance L9b. It can be seen from the diagrams that the distance L9b is shorter than the distance L9a. As a distance between the gravity center 511c of the opening forming area 511 (the first scrap) and the skid 13 increases, the opening forming area 511 becomes more likely to fall off and, alternatively as the distance decreases, the opening forming area 511 becomes less likely to fall off.

In this manner, by setting the dividing line 52 on the side opposite to the gravity center 51c across the skid 13, the opening forming area 51 is cut with the dividing line 52 and it is possible to increase the possibility of falling off of the first scrap interfering with the skid 13 among two scraps formed by cutting the periphery of the opening forming area 51.

In a case where the number of skid 13 interfering with the opening forming area 51 is one and the gravity center 51c is positioned within the margin Aw1 from the skid 13 is in the proximity state with the skid 13, the processes of steps S402 to S405 by the CAM device 30 mean the setting of the dividing line 52 is as follows.

As a first condition, the CAM device 30 sets the dividing line 52 to a position apart by a sufficient distance from the interfering skid 13 and at a distance in which the material of the opening forming area 51 is not welded to the skid 13 in a case where the laser processing machine 100 cuts the opening forming area 51 with the dividing line 52.

After the laser processing machine 100 cuts the opening forming area 51 with the dividing line 52 and cuts the periphery of the opening forming area 51, the opening forming area 51 is divided into the first scrap interfering with the skid 13 and the second scrap not interfering with the skid 13. As a second condition, the CAM device 30 sets the dividing line 52 at a distance in which a gravity center (a second gravity center) of the first scrap is positioned at a distance longer than the margin Aw1 from the interfering skid 13.

According to the processes of step S403 to S405, it is possible to easily meet the first and second conditions necessary when the number of skid 13 interfering with the opening forming area 51 is one.

Returning to FIG. 5, in step S402, as illustrated in FIG. 6C, in a case where it is not determined that the number of interfering skid 13 is one (NO) (that is, in a case where the number of interfering skid 13 is two or more), the CAM device 30, in step S406, sets a position of the skid 13 in a first row on the first side of the part 50 as a reference position. The CAM device 30, in step S407, determines whether the division of the opening forming area 51 at a position apart by the predetermined distance from the reference position on the first side is possible.

Figure 10A:
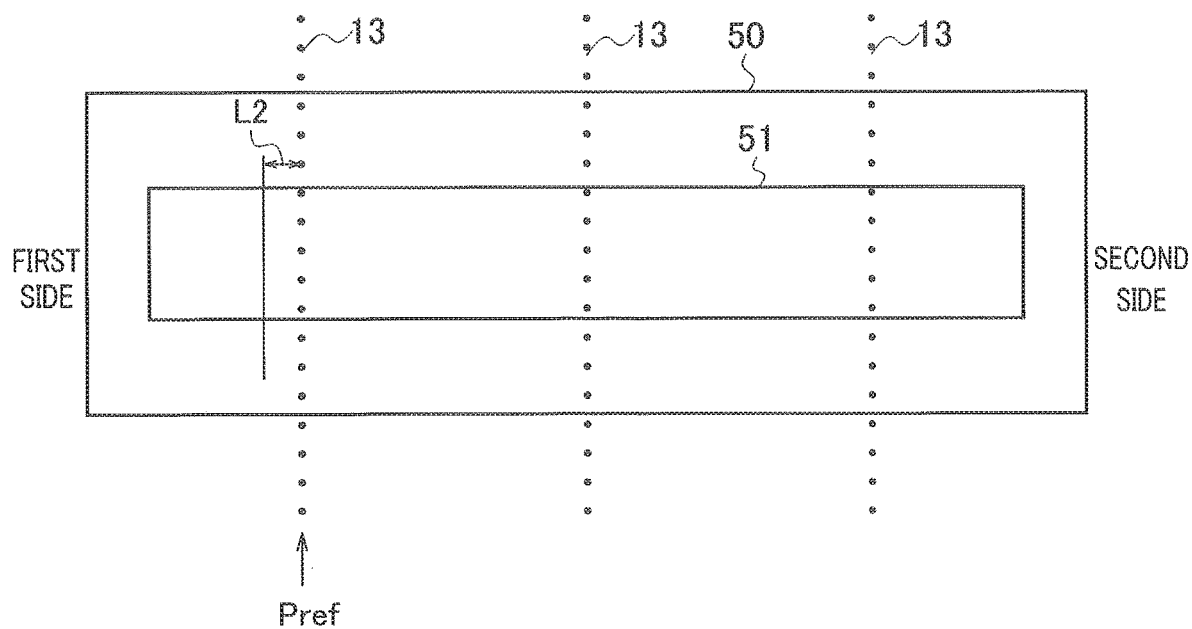
FIG. 10A is a diagram illustrating an example of a case where, by processes of steps S406 and S407 in FIG. 5, a position of a skid in a first row is set as a reference position and an opening forming area can be divided at a position that is apart by a second distance from the reference position on a first side.
Figure 10B:
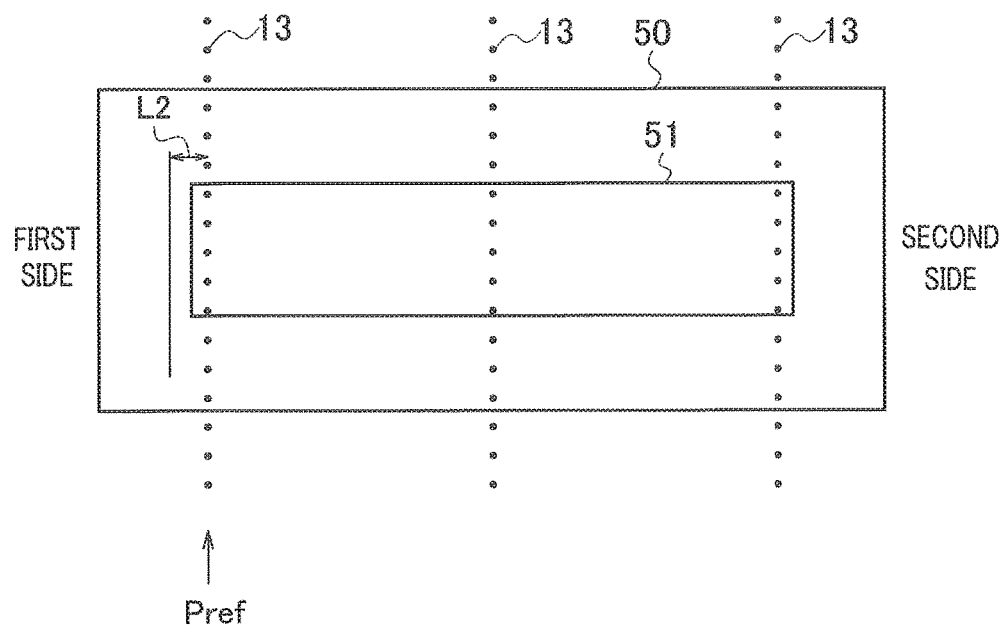
FIG. 10B is a diagram illustrating an example of a case where, by processes of steps S406 and S407 in FIG. 5, a position of a skid in a first row is set as a reference position and an opening forming area may not be divided at a position that is apart by a second distance from the reference position on a first side.

With reference to FIG. 10A and FIG. 10B, the processes of step S406 and step S407 are specifically described. Here, a case where the three skids 13 interfere with the opening forming area 51 is taken as an example. A first side of the part 50 (or the opening forming area 51) is one side of one end portion among both end portions of the part 50 in the alignment direction of the skids 13. A second side is the other side of the other end portion among the both end portions of the part 50 in the alignment direction of the skids 13. Whichever of the both end portions may be the first side and whichever of the both end portions may be the second side.

As illustrated in FIG. 10A, the CAM device 30 sets the position of the skid 13 in the first row on the first side of the part 50 to a reference position Pref, and determines whether the division of the opening forming area 51 is possible at a positon apart by the predetermined distance L2 (a second distance) from the reference position Pref on the first side. The distance L2 is sufficiently shorter than a skid interval and may be the same as or different from the distance L1 used in step S405. The CAM device 30 may hold a set value of the distance L2 or an operator may set the distance L2. A specific distance of the distance L2 may be set to an appropriate distance as a design matter.

In a case of FIG. 10A, the CAM device 30 determines that the division of the opening forming area 51 is possible at the position apart by the distance L2.

On the other hand, in a case of FIG. 10B, the position apart by the distance L2 from the reference position Pref on the first side is an outside of the opening forming area 51 (an inside of the part 50), and thus, the CAM device 30 determines that the division of the opening forming area 51 is not possible at the position apart by the distance L2.

Figure 11:
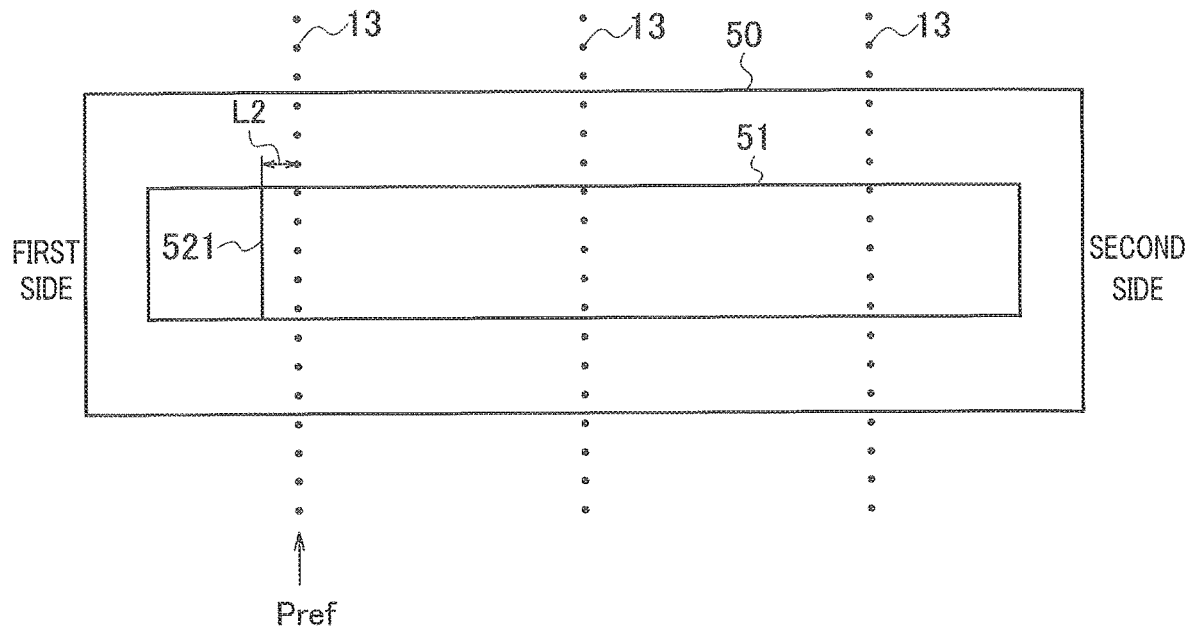
FIG. 11 is a diagram illustrating a state in which, in step S408 of FIG. 5, a position of a skid in a first row is set as a reference position and a dividing line is set at a position that is apart by a second distance from the reference position on a first side.

In step S407, in a case where it is determined that the division of the opening forming area 51 is possible (YES), the CAM device 30, as illustrated in FIG. 11, in step S408, sets the dividing line 521 to the position apart by the distance L2 from the reference position Pref on the first side and advances a process to step S409. Alternatively, in step S407, in a case where it is not determined that the division of the opening forming area 51 is possible (NO), the CAM device 30 advances a process to step S409.

The CAM device 30, in step S409, sets a position of the skid 13 that is adjacent on the second side to a reference position. In a case where the CAM device 30 performs the process of step S409 for the first time, the skid 13 that is adjacent on the second side is the skid 13 in the second row as illustrated in FIG. 12.

The CAM device 30 determines in step S410 whether a position of the skid 13 that is the last in order from the first side is set to a reference position. In a case where it is not determined that the position of the last skid 13 is set to the reference position (NO), the CAM device 30 returns a process to step S407 and repeats the processes of step S407 to S410.

Figure 12:
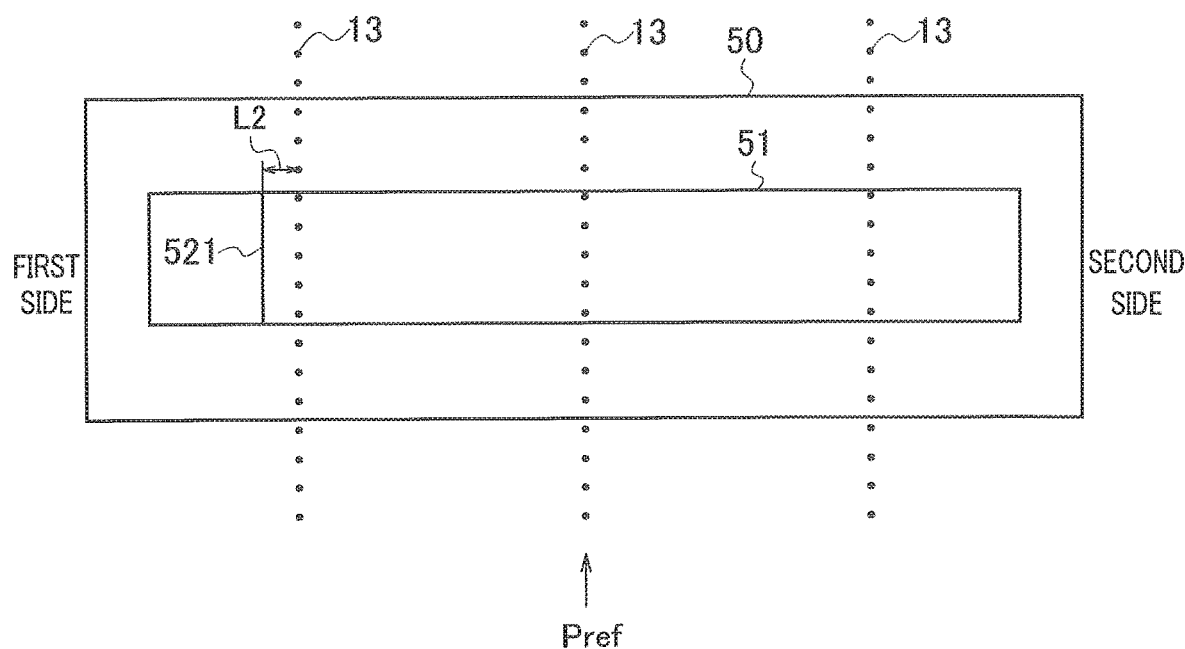
FIG. 12 is a diagram illustrating a state in which, in step S409 of FIG. 5, a position of a skid in a second row is set as a reference position.
Figure 13:
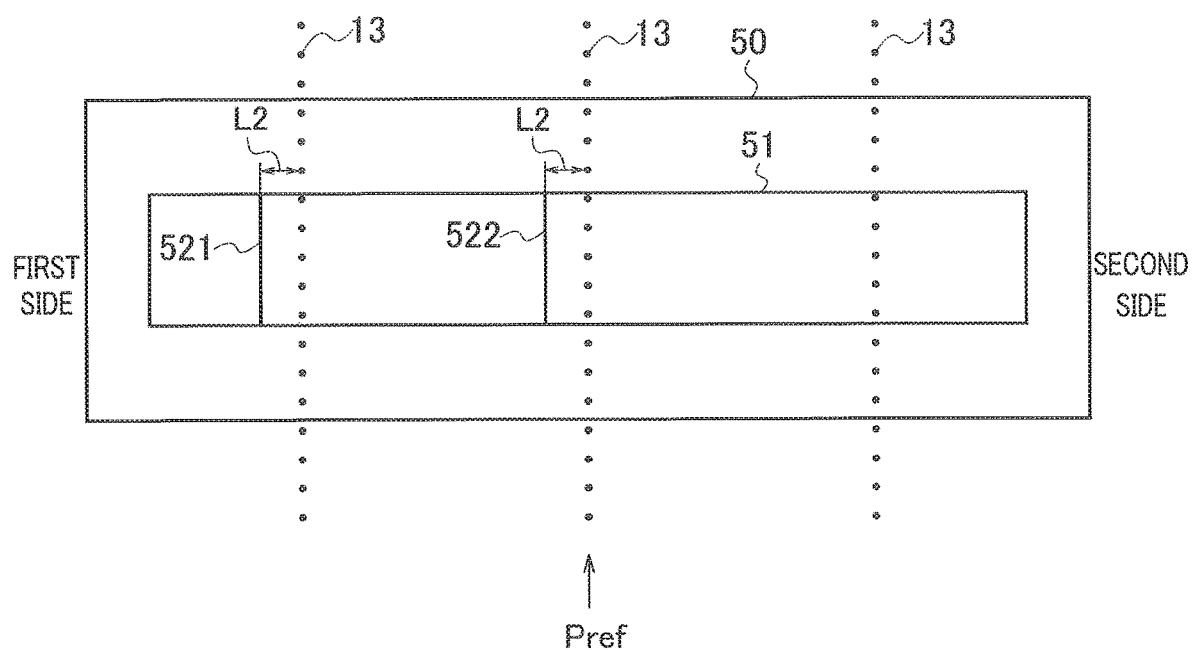
FIG. 13 is a diagram illustrating a state in which, in step S408 of FIG. 5, a position of a skid in a second row is set as a reference position and a dividing line is set at a position that is apart by a second distance from the reference position on a first side.

As illustrated in FIG. 12, in a case where the position of the skid 13 in the second row is set to the reference position Pref, the skid 13 in the second row is not the last skid 13. Therefore, as illustrated n FIG. 13, the CAM device 30, in step S408, sets the dividing line 522 to the position apart by the distance L2 from the reference position Pref on the first side.

In step S410, in a case where it is determined that the position of the last skid 13 is set to the reference position (YES), the CAM device 30, in step S411, determines whether the division of the opening forming area 51 is possible at a position apart by the predetermined distance from the reference position on the second side. In a case where it is determined that the division of the opening forming area 51 is possible (YES), the CAM device 30 advances a process to step S412 and alternatively, in a case where it is not determined that the division of the opening forming area 51 is possible (NO), the CAM device 30 advances a process to step S413.

Figure 14A:
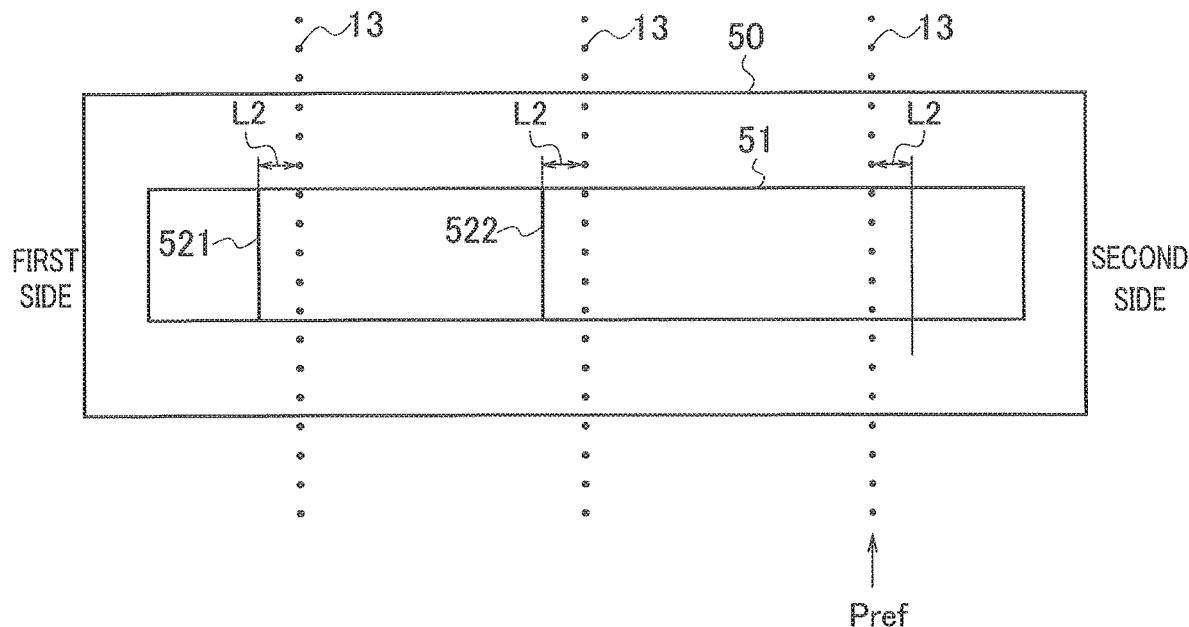
FIG. 14A is a diagram illustrating a case in which a position of a last skid is set as a reference position and an opening forming area may be divided at a position that is apart by a second distance from the reference position on a second side.
Figure 14B:
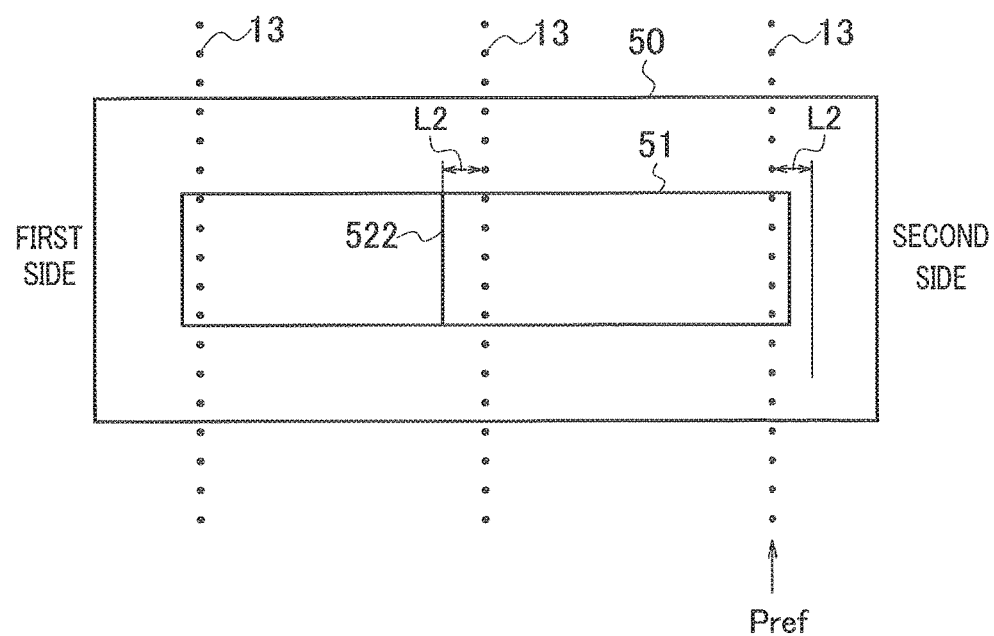
FIG. 14B is a diagram illustrating a case where a position of a last skid is set as a reference position and an opening forming area may not be divided at a position that is apart by a second distance from the reference position on a second side.

FIG. 14A illustrates a case where a position of the skid 13 in the third row that is the last skid 13 is set to the reference position Pref and the division of the opening forming area 51 is possible at the position apart by the distance L2 from the reference position Pref on the second side. FIG. 14B illustrates a case where the position apart by the distance L2 from the reference position Pref on the second side is an outside of the opening forming area 51 (an inside of the part 50), and accordingly the division of the opening forming area 51 is not possible. FIG. 14B illustrates, as an example, a case where the dividing line 521 is failed to be set in a case where the position of the skid 13 in the first row on the first side is set to the reference position Pref.

Figure 15:
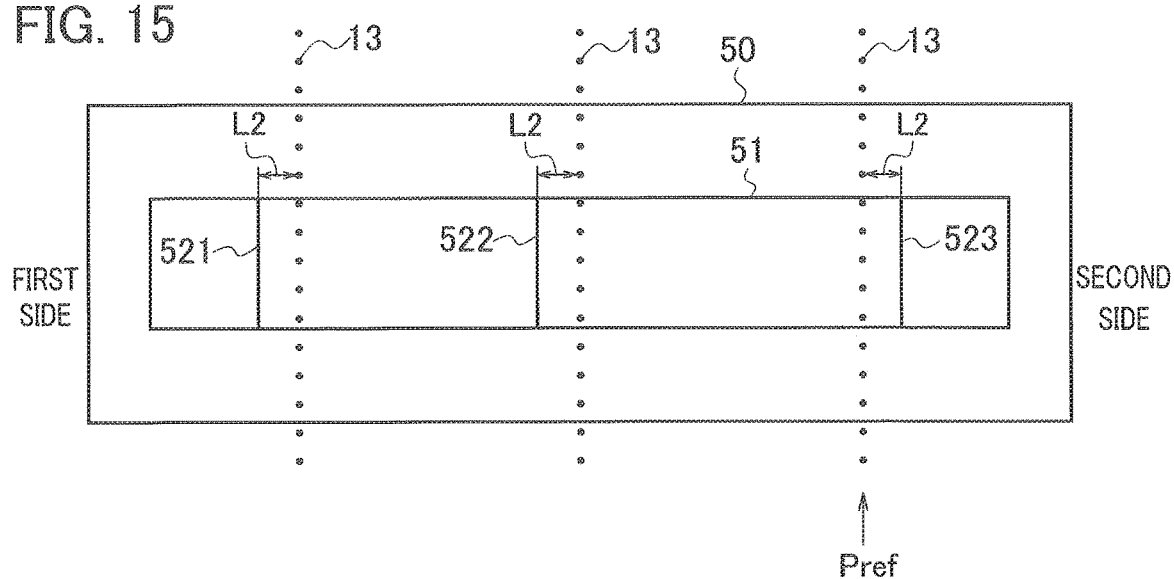
FIG. 15 is a diagram illustrating a state in which a position of a last skid is set as a reference position and a dividing line is set at a position that is apart by a second distance from the reference position on a second side.

In a case of FIG. 14A, the CAM device 30, in step S411, determines that the division of the opening forming area 51 is possible at the position apart by the distance L2 from the reference position Pref on the second side. Therefore, in step S412, as illustrated in FIG. 15, the CAM device 30 sets the dividing line 523 to the position apart by the distance L2 from the reference position Pref on the second side.

Figure 16:
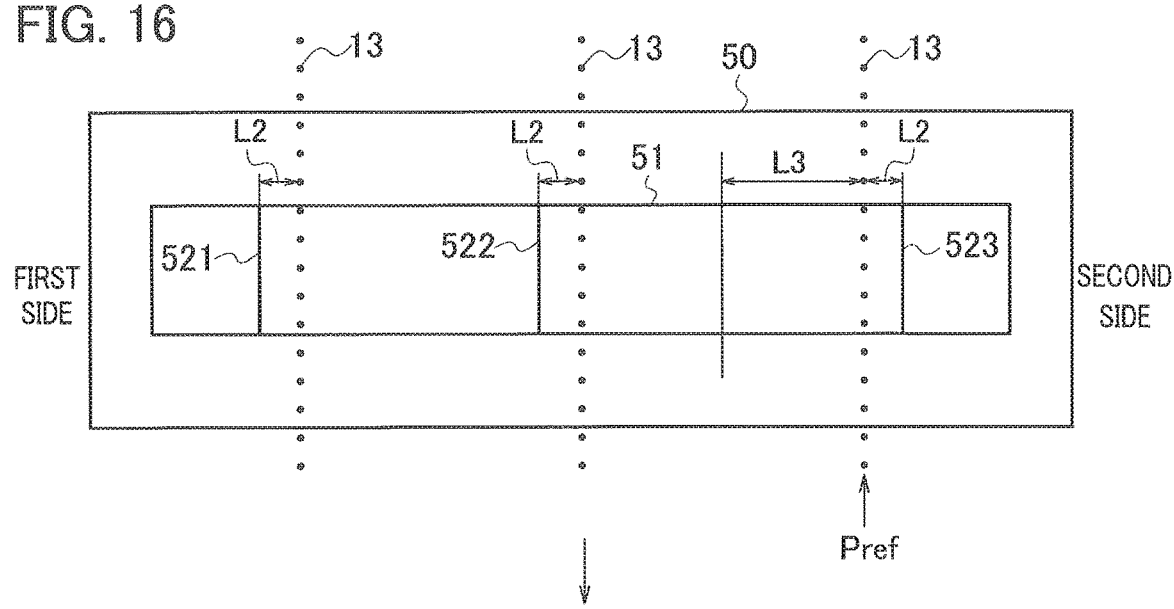
FIG. 16 is a diagram illustrating a state in which, in step S413 of FIG. 5, a position of a last skid is set as a reference position and a dividing line is set at a position that is apart by a distance that is one-half of a skid interval from the reference position on a first side.
Figure 16:
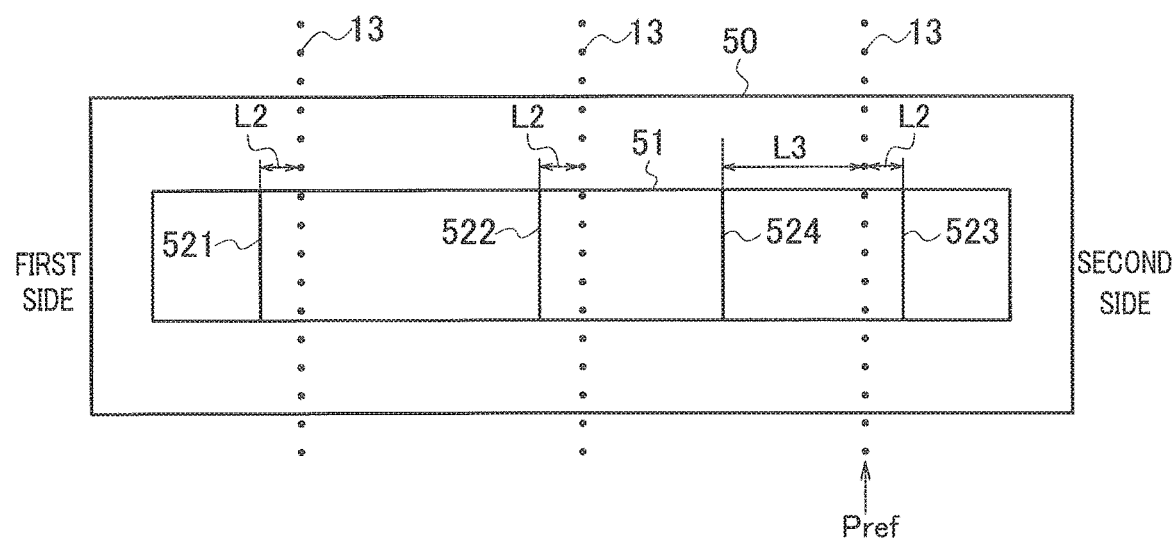

Continuously, the CAM device 30, in step S413, sets a dividing line to a position apart from the reference position Pref by a distance that is one-half of the skid interval on the first side and causes the process to be ended. As illustrated in FIG. 16, the CAM device 30 sets the dividing line 524 to a position apart from the reference position Pref by the distance L3 that is one-half of the skid interval on the first side.

In this manner, it is preferable to set the dividing line to a center position between the last skid 13 and the skid 13 that is on the first side of the last skid 13 and is adjacent to the last skid 13, but slight shifting from the center position is allowable. The CAM device 30 may set the dividing line to the intermediate position between the last skid 13 and the adjacent skid 13 on the first side.

Figure 17A:
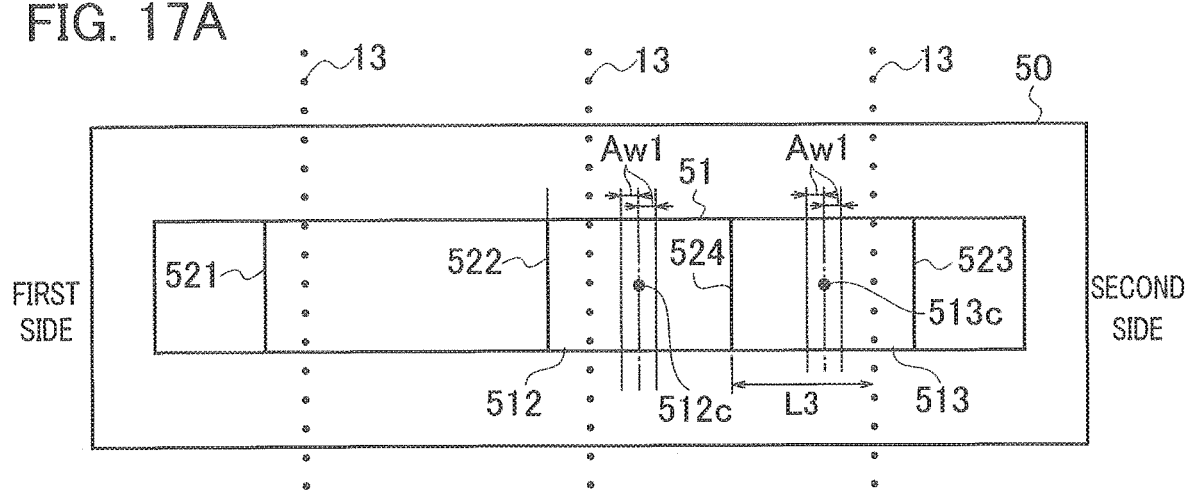
FIG. 17A is a diagram illustrating a position of a gravity center of a scrap in a case where a dividing line is set at a position that is apart by a distance that is one-half of a skid interval and an opening forming area is cut.
Figure 17B:
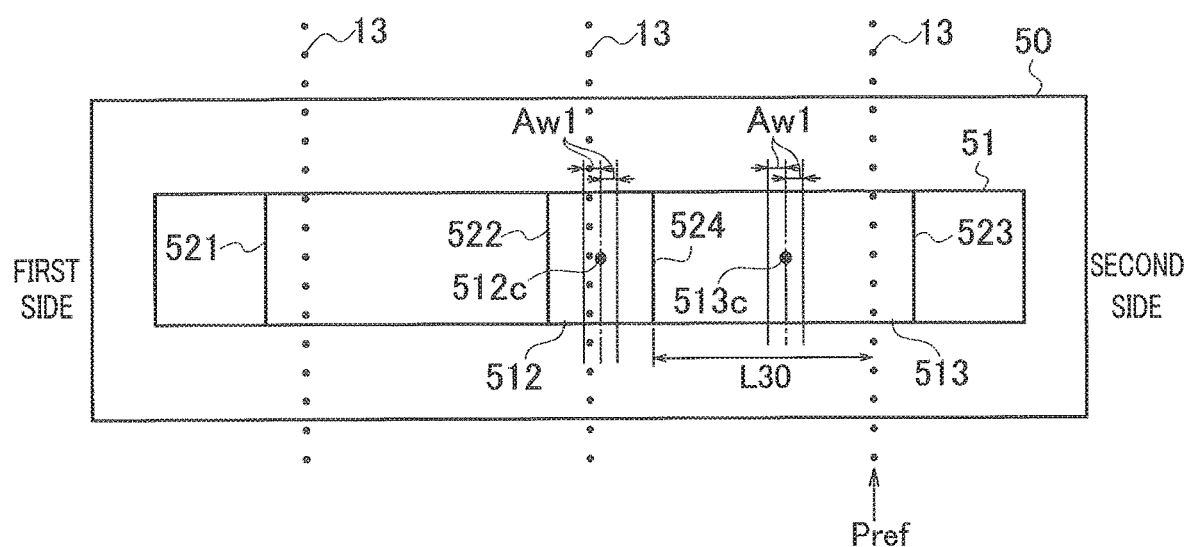
FIG. 17B is a diagram illustrating a position of a gravity center of a scrap in a case where a dividing line is set at a position that is apart by a distance that is remarkably longer than one-half of a skid interval and an opening forming area is cut.

With reference to FIG. 17A and FIG. 17B, the preferable way of setting the intermediate position is described. As illustrated in FIG. 16, FIG. 17A illustrates a case where the dividing line 524 is set to a position that is apart from the skid 13 in the third row by the distance L3 that is one-half of the skid interval in the first side. In a case where the laser processing machine 100 cuts the opening forming area 51 the dividing lines 521 to 524 and cuts the periphery of the opening forming area 51, the opening forming area 512 between the dividing line 522 and the dividing line 524 and the opening forming area 513 between the dividing line 523 and the dividing line 524 become scraps interfering with the skid 13.

As can be seen from FIG. 17A, a gravity center 512c of the opening forming area 512 is not positioned within the margin Aw1 from the interfering skid 13, and is sufficiently apart from the skid 13. Similarly, a gravity center 513c of the opening forming area 513 is not positioned within the margin Aw1 from the interfering skid 13 and is sufficiently apart from the skid 13. Accordingly, scraps of the opening forming areas 512 and 513 almost certainly fall off.

FIG. 17B illustrates a case where the dividing line 524 is set to a position apart from the skid 13 in the third row in the first side by a distance L30 longer than the distance L3 that is one-half of the skid interval. In this case, the gravity center 512c of the opening forming area 512 is positioned within the margin Aw1 from the interfering skid 13 and sometimes is proximate to the skid 13. Accordingly, the scrap of the opening forming area 512 sometimes does not fall off.

That is, the intermediate position, at which the dividing line is set, between the last skid 13 and the skid 13 that is adjacent on the first side of the last skid 13 may be a position that meets a condition in which gravity centers of two scraps that are a scrap interfering with the last skid 13 and a scrap interfering with the adjacent skid 13 on the first side are not positioned within the margin Aw1 from the skid 13. The distance L3 that is one-half of the skid interval can easily meet the condition.

The reasons why the dividing line is set to the position apart by the distance L2 from the reference position Pref on the second side only in a case where the position of the last skid 13 is set to the reference position Pref are as follows.

Figure 18:
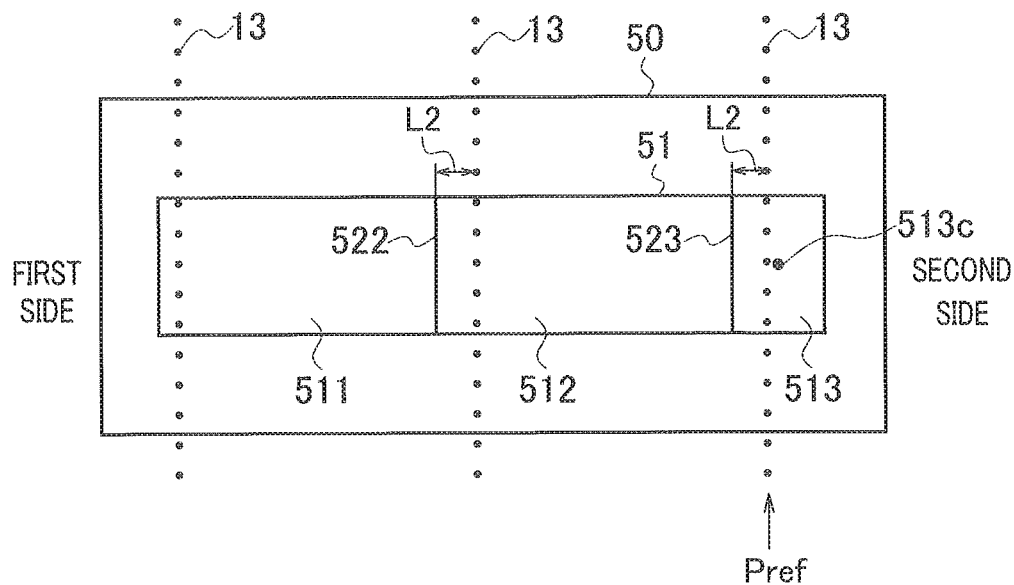
FIG. 18 is a diagram illustrating a state in which a scrap interfering with a last skid is less likely to fall off in a case where a position of a last skid is set as a reference position and a dividing line is set at a position that is apart by a second distance from the reference position on a first side.

FIG. 18 illustrates an example of a case where the dividing line 523 is set to the position apart by the distance L2 from the reference position Pref on the first side even in a case where the position of the last skid 13 is set to the reference position Pref. In this case also, a case where the dividing line 521 is failed to be set in a case where the position of the skid 13 in the first row on the first side is set to the reference position Pref is described.

The divided opening forming areas 51 obtained after the opening forming area 51 being cut with the dividing lines 522 and 523 are defined as opening forming areas 511 to 513. In FIG. 18, after the laser processing machine 100 cuts the opening forming area 51 with the dividing lines 522 and 523 and cuts the periphery of the opening forming area 51, the opening forming areas 511 to 513 become first to third scraps interfering with the skid 13 respectively. The opening forming area 513 sometimes does not fall off because the gravity center 513c of the opening forming area 513 (the third scrap) is proximate to the skid 13.

Figure 19:
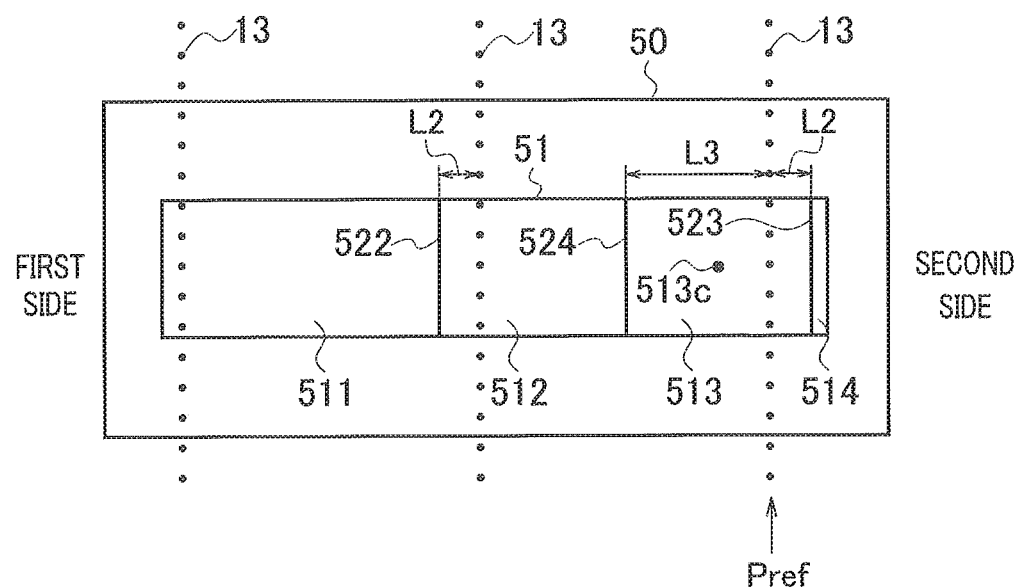
FIG. 19 is a diagram illustrating a state in which a scrap interfering with a last skid is likely to fall off in a case where a position of a last skid is set as a reference position and a dividing line is set at a position that is apart by a second distance from the reference position on a second side.

FIG. 19 illustrates a state where the dividing lines 523 and 524 are set through the processes illustrated in FIG. 5. The divided opening forming areas 51 obtained by the opening forming area 51 being cut with dividing lines 522 to 524 are defined as opening forming areas 511 to 514. In FIG. 19, after the laser processing machine 100 cuts the opening forming area 51 with the dividing lines 522 to 524 and cuts the periphery of the opening forming area 51, the opening forming areas 511 to 513 become the first to third scraps interfering with the skid 13 respectively and the opening forming area 514 becomes a fourth scrap not interfering with the skid 13. A distance between the gravity center 513c of the opening forming area 513 (the third scrap) and the skid 13 is sufficiently long, and thus, the opening forming area 513 is likely to fall off.

In this manner, in a case where the position of the last skid 13 is set to the reference position Pref, the CAM device 30 sets the dividing line 523 to the position apart by the distance L2 from the reference position Pref on the second side and sets the dividing line 524 to the intermediate position apart from the reference position Pref by, for example, a distance L3 on the first side. This can increase the possibility of falling off of the opening forming area 513 interfering with the last skid 13.

In a case where the laser processing machine 100 cuts the opening forming area 51 with the dividing lines 521 to 524 set in steps S408, S412, and S413, the material of the opening forming area 51 is not welded to the skid 13 and the skid 13 does not fuse because all of the dividing lines 521 to 524 are distant from the skid 13.

By the way, in FIG. 11 to FIG. 16, a position of each skid 13 is set to the reference position Pref and each of the dividing lines 521 to 523 is set to the positon apart by the distance L2 on the first side or on the second side. All types of the distance L2 do not need to have the same distance. A specific distance may be set to each reference position Pref and each dividing line may be set to a position apart by the specific distance from the reference position Pref.

The processes of steps S406 to S413 performed by the CAM device 30 mean that the dividing line is set as follows in a case where the number of the skid 13 interfering with the opening forming area 51 is two or more.

Figure 20:
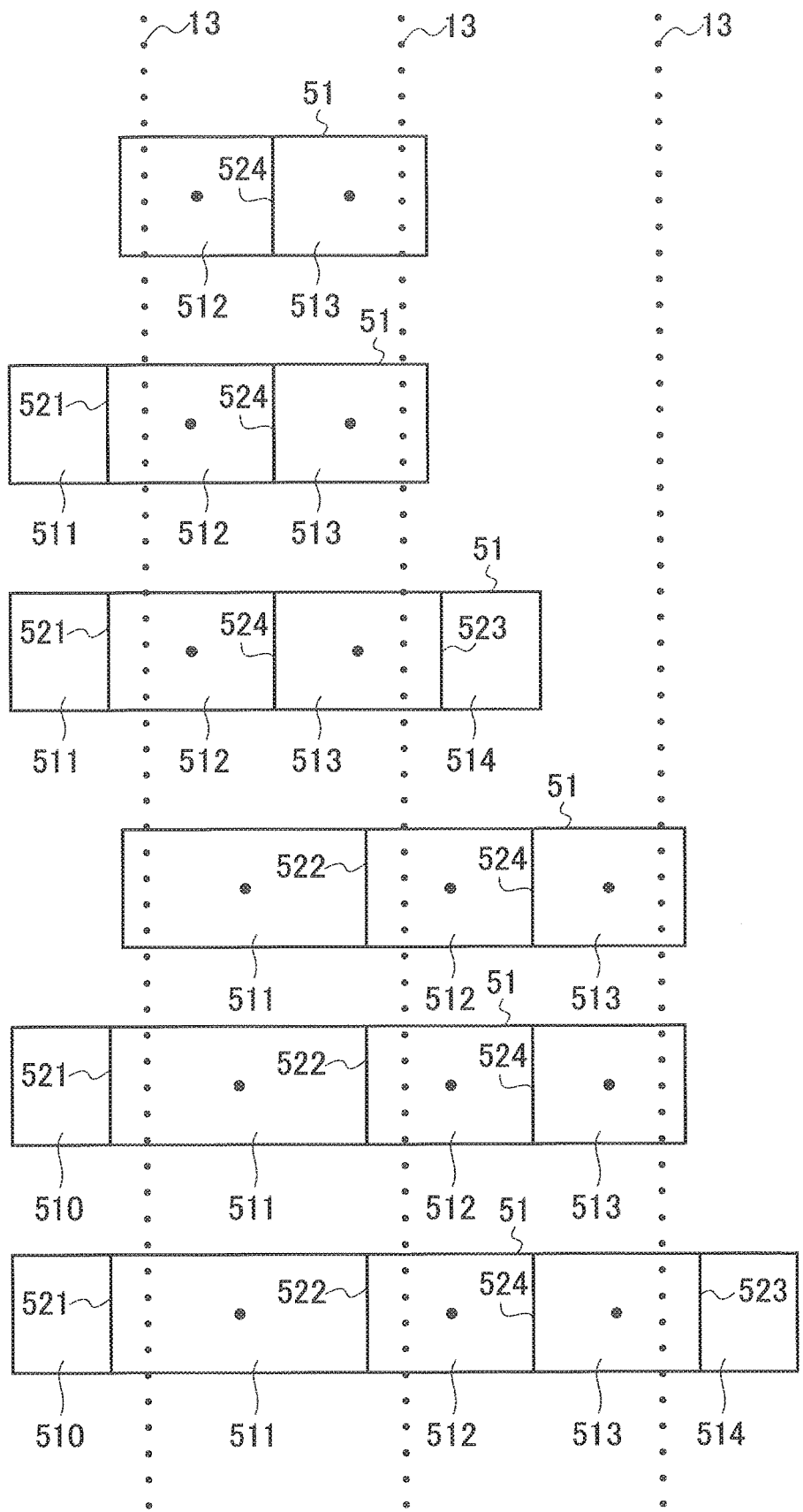
FIG. 20 is a diagram illustrating examples of setting patterns of dividing lines as a whole in a case where an opening forming area interferes with two or three skids.

FIG. 20 illustrates examples of patterns for setting dividing lines in a case where the opening forming area 51 interferes with the two skids 13 and illustrates examples of patterns for setting dividing lines in a case where the opening forming area 51 interferes with the three skids 13. In a case where the opening forming area 51 interferes with the two skids 13, the number of dividing lines is one at its minimum and the number of dividing lines is three at its maximum. In a case where the opening forming area 51 interferes with the three skids 13, the number of dividing lines is two at its minimum and the number of dividing lines is four at its maximum. That is, in a case where the opening forming area 51 interferes with the n skids 13, the number of dividing lines is (n−1) at its minimum and the number of dividing lines is (n+1) at its maximum.

In FIG. 20, among opening forming areas 510 to 514 obtained by cutting the opening forming area 51 with the dividing lines 521 to 524, a gravity center of an opening forming area (a scrap) interfering with the skid 13 is illustrated by a black circle in the diagram.

The CAM device 30 may set the dividing line in the manner to meet the next condition. As the first condition, the CAM device 30 sets the dividing line to a position which is sufficiently apart from the skid 13 in a scrap which interferes with the skid 13, and in which the material of the opening forming area 51 is not welded to the skid 13 in a case where the laser processing machine 100 cuts the opening forming area 51 with the dividing line. As the second condition, the CAM device 30 sets the dividing line to a position in which the gravity center (the first gravity center) of the scrap interfering with the skid 13 is positioned at a distance longer than the margin Aw1 from the interfering skid 13.

According to the processes of steps S406 to S413, it is possible to easily meet the first and second conditions that are necessary in a case where the number of skid 13 interfering with the opening forming area 51 is two or more. In the processes of steps S406 to S413, a gravity center of each scrap is not calculated, but by appropriately setting the distances L2 and L3, it is possible to meet the first and second conditions.

The processes of setting the dividing line by the CAM device 30 illustrated in FIG. 5 are processes suitable for meeting the first and second conditions that are necessary in a case where the number of skid 13 interfering with the opening forming area 51 is one and the first and second conditions that are necessary in a case where the number of skid 13 interfering with the opening forming area 51 is two or more. The summarized processes of FIG. 5 are as follows.

In a case where the CAM device 30 determines that the one skid 13 interferes with the opening forming area 51, the CAM device 30 performs the next process. The CAM device 30 calculates the gravity center 51c of the opening forming area 51. The CAM device 30 determines whether the interfering skid 13 is positioned within the predetermined margin Aw1 from the gravity center 51c of the opening forming area 51 in the alignment direction of the skids 13 and is in the proximity state. In a case where the CAM device 30 determines that the skid 13 is in the proximity state, the CAM device 30 sets the first dividing line (the dividing line 52) to a position that is on the side opposite to the gravity center 51c across the interfering skid 13 in the opening forming area 51 and is apart by the distance L1 from the interfering skid 13.

By assuming that n is an integer of two or more, in a case where the CAM device 30 determines that the n skids 13 interfere with the opening forming area 51, the CAM device 30 performs the next process. The CAM device 30 sets, as a first reference position (a reference position Pref), each of the positions of the skids 13 from the first row to the (n−1)th row in the order from the first side of the part 50 in the alignment direction of the skids 13. The CAM device 30 determines whether a first separation position apart from the first reference position on the first side by the distance L2 is positioned within the opening forming area 51. The distance L2 may be either the same or different from the distance L1.

In a case where the CAM device 30 determines that the first separation position is positioned within the opening forming area 51, the CAM device 30 sets a second dividing line to the first separation position. In a case where n is three, the number of the second dividing line is two that are the dividing lines 521 and 522 or the number of the second dividing line is one that is the dividing line 522.

The CAM device 30 sets a third dividing line (a dividing line 524) to the intermediate position between the skid 13 in the (n−1)th row and the skid 13 in the nth row in order from the first side. At this time, the CAM device 30 may set the position of the skid 13 in the nth row to a second reference position (a reference position Pref) and may set the third dividing line to a position apart from the second reference position on the first side by the distance that is one-half of the skid interval. The CAM device 30 may set the third dividing line to a position which is apart from the first reference position that is a position of the skid 13 in the (n−1)th row on the second side opposite to the first side by the distance that is one-half of the skid interval.

As described above, the position of the third dividing line is not limited to be set to a positon apart from the first or second reference position by the distance that is one-half of the skid interval and may be set to the intermediate position between the skids.

The CAM device 30 determines whether a second separation position apart from the second reference position on the second side by the second distance is positioned within the opening forming area 51. In a case where the CAM device 30 determines that the second separation position is positioned within the opening forming area 51, the CAM device 30 sets a fourth dividing line (a dividing line 523) to the second separation position.

By the above described processes illustrated in FIG. 5, in step S4 of FIG. 3, a dividing line is set to an optimal position in accordance with the number of skid 13 interfering with the opening forming area 51.

Figure 21:
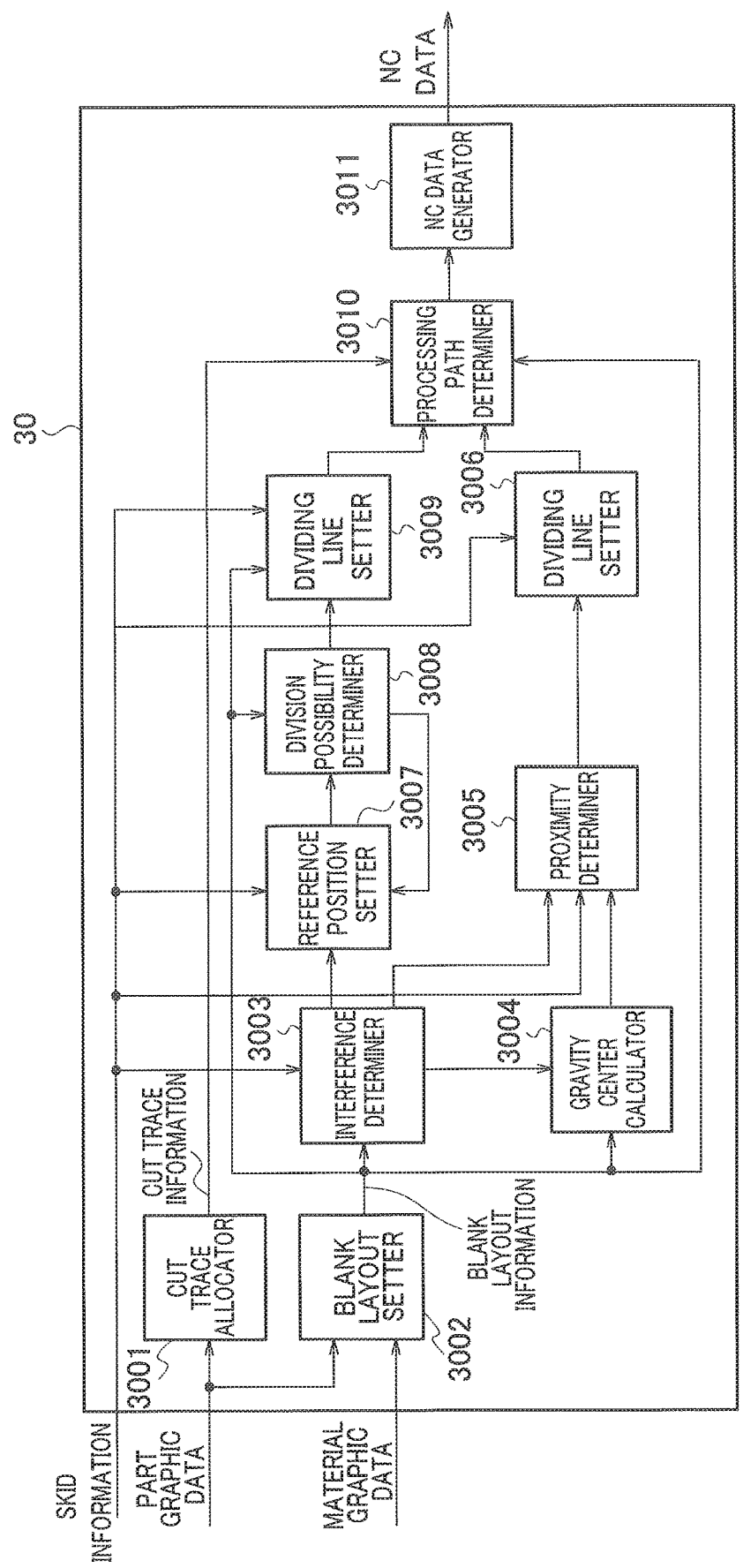
FIG. 21 is a block diagram illustrating an example of functional configurations of the CAM that generates NC data.

FIG. 21 illustrates an example of a functional configuration of the CAM device 30 for performing the processes illustrated in FIG. 3 and FIG. 5. The CAM device 30 has fictional configurations as illustrated in FIG. 21 by executing software of CAM (a computer program).

In FIG. 21, a cut trace allocator 3001, based on the graphic data of the part 50 (hereinafter referred to as part graphic data) read from the database 40, allocates a cut trace to the part 50 and outputs cut trace information. A blank layout setter 3002, based on part graphic data information and the graphic data of the sheet metal W (hereinafter referred to as material graphic data) read from the database 40, performs the blank layout and outputs blank layout information.

An interference determiner 3003, based on the blank layout information and the skid information read from the database 40, determines whether the skid 13 interferes with the opening forming area 51, and in a case where the skid 13 interferes with the opening forming area 51, determines the number of the interfering skid 13. In a case where the number of skid 13 interfering with the opening forming area 51 is one, a gravity center calculator 3004, a proximity determiner 3005, and a dividing line setter 3006 operate. In a case where the number of skid 13 interfering with the opening forming area 51 is two or more, a reference position setter 3007, a division possibility determiner 3008, and a dividing line setter 3009 operate.

The gravity center calculator 3004, based on the blank layout information, calculates the gravity center of the opening forming area 51 and supplies position information on a gravity center to a proximity determiner 3005. The proximity determiner 3005, based on the skid information and the position information on the gravity center, determines whether the skid 13 is proximate to the gravity center 51c and is in the proximity state. A dividing line setter 3006 sets a first dividing line in a case where the skid 13 is in the proximity state and alternatively does not set a dividing line in a case where the skid 13 is not in the proximity state.

The reference position setter 3007 sets the position of the skid 13 in the first row on the first side in the alignment direction of the skids 13 as the first reference position. The division possibility determiner 3008 determines whether the division of the opening forming area 51 is possible depending on whether a first separation position is positioned within the opening forming area 51. The dividing line setter 3009 sets the second dividing line to the first separation position in a case where the division is possible and alternatively does not set the dividing line in a case where the division is not possible.

Each time the division possibility determiner 3008 determines whether the division of the opening forming area 51 is possible, the reference position setter 3007 shifts the position of the skid 13 that is set as the first reference position in the order from the first side to the second side. Until the reference position setter 3007 sets the position of the skid 13 in the (n−1)th row to the first reference position, the division possibility determiner 3008 and the dividing line setter 3009 repeat the same operation.

After the reference position setter 3007 sets the position of the skid 13 in the nth row to the second reference position, the division possibility determiner 3008 determines whether the division of the opening forming area 51 is possible depending on whether the second separation position is positioned within the opening forming area 51. The dividing line setter 3009 sets the fourth dividing line to the second separation position in a case where the division is possible and alternatively does not set the dividing line in a case where the division is not possible.

Irrespective of whether the fourth dividing line is set, the dividing line setter 3009 further sets the third dividing line to a position apart from the second reference position on the first side by, for example, the distance that is one-half of the skid interval.

A processing path determiner 3010, based on the cut trace information, the blank layout information, and the dividing line set by the dividing line setter 3006 or 3009, determines the processing path for cutting the sheet metal W with a laser beam.

In a case where the dividing line is set within the opening forming area 51, the processing path determiner 3010 determines the processing path such that, after the opening forming area 51 is cut with the dividing line, the periphery of the opening forming area 51 is cut, and thereafter the periphery of the part 50 is cut. By the determination as above, first, the opening forming area 51 is divided into a plurality of scraps, and then falls off and is removed from the sheet metal W, and thereafter the parts 50 are cut out of the sheet metal W.

In a case where the dividing line is not set within the opening forming area 51, the processing path determiner 3010 determines the processing path such that after the periphery of the opening forming area 51 is cut, the periphery of the part 50 is cut.

An NC data generator 3011 generates NC data for cutting the sheet metal W in accordance with the processing path determined by the processing path determiner 3010. The NC data may be supplied to the NC device 20 or may be supplied to and stored in the database 40. The NC device 20 may control the processing machine body 80 based on the NC data supplied from the CAM device 30 or may control the processing machine body 80 based on the NC data read from the database 40.

Figure 22:
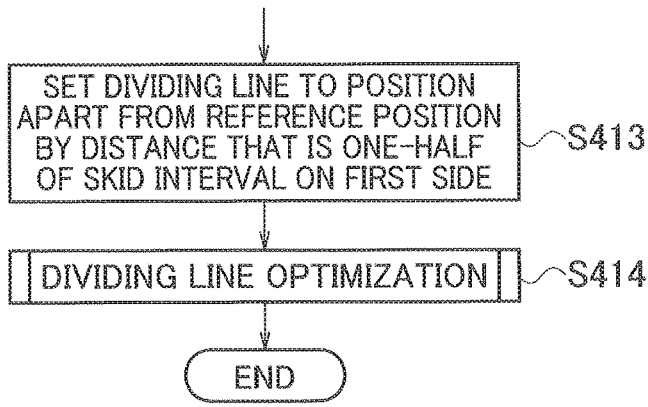
FIG. 22 is a flowchart illustrating a partial process in which, to a process of setting a dividing line in step S4 of FIG. 3, a dividing line optimization process is added.
Figure 23:
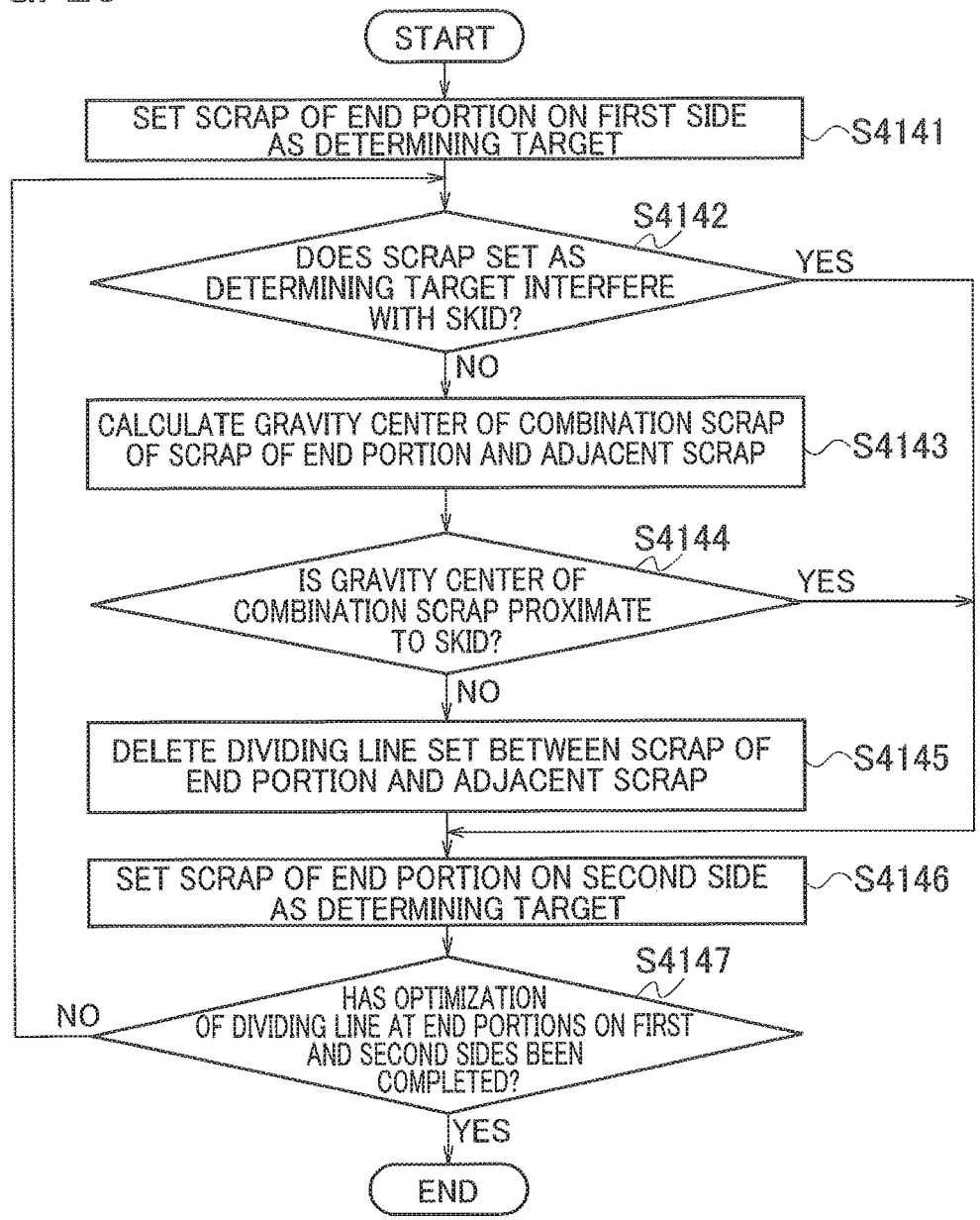
FIG. 23 is a flowchart illustrating specific processes of dividing line optimization processes illustrated in FIG. 22.

By the way, the number of dividing lines set within the opening forming area 51 is preferably small in a case where the effect of falling off the caused scrap is in the same level. As the improved version of the process illustrated in FIG. 5, as illustrated in FIG. 22, after step S413, a dividing line optimization process of step S414 may be provided. FIG. 23 illustrates specific processes of the dividing line optimization processes.

The specific processes of the dividing line optimization processes illustrated in FIG. 23 are described with reference to FIG. 24A to FIG. 29. In FIG. 23, the CAM device 30, in step S4141, sets a scrap of an end portion on a first side as a determining target. The CAM device 30, in step S4142, determines whether the scrap set as the determining target interferes with the skid 13.

Figure 24A:
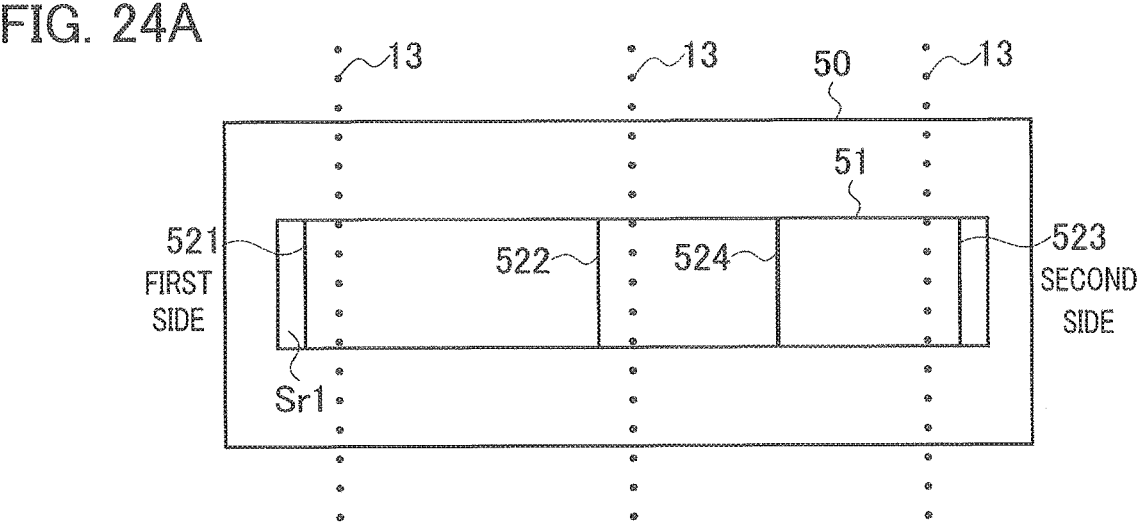
FIG. 24A is a diagram illustrating a first example in which a scrap of an end portion on a first side does not interfere with a skid.
Figure 24B:
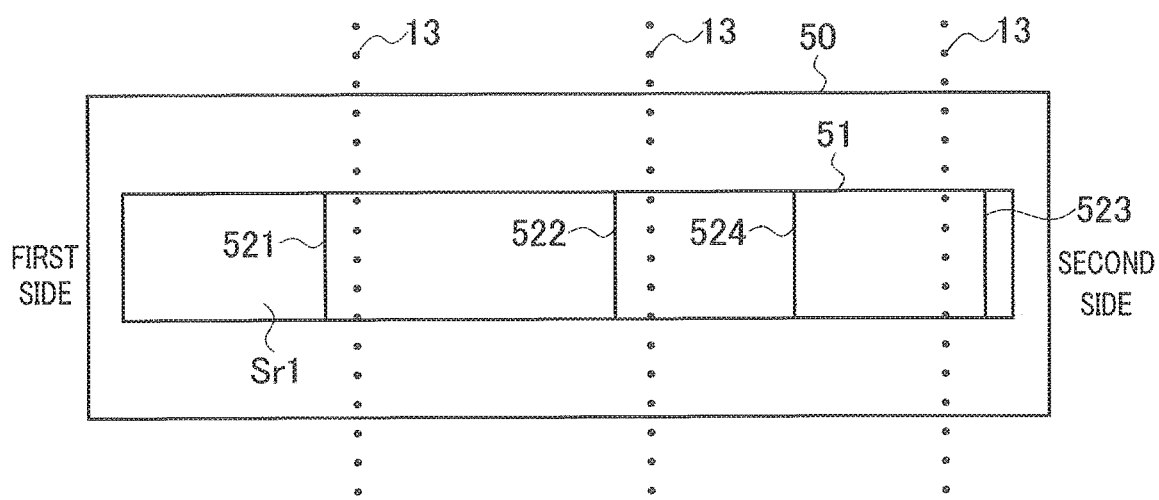
FIG. 24B is a diagram illustrating a second example in which a scrap of an end portion on a first side does not interfere with a skid.
Figure 24C:
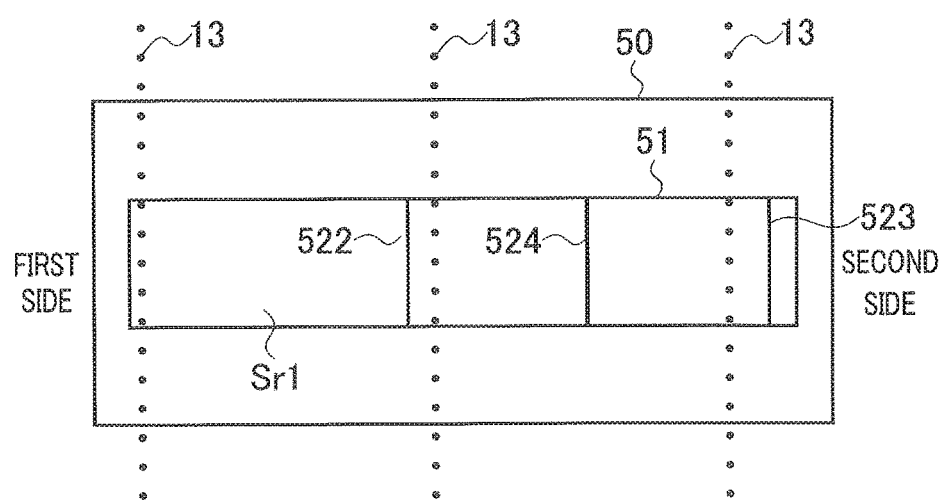
FIG. 24C is a diagram illustrating an example in which a scrap of an end portion on a first side does not interfere with a skid.

FIG. 24A and FIG. 24B are first and second examples respectively in which a scrap Sr1 of the end portion on the first side does not interfere with the skid 13 and FIG. 24C is an example in which the scrap Sr1 of the end portion on the first side interferes with the skid 13. The CAM device 30 advances a process to step S4146 in a case where the scrap set as the determining target interferes with the ski 13 (YES) and alternatively advances a step to step S4143 in a case where the scrap set as the determining target does not interfere with the ski 13 (NO).

Figure 25A:
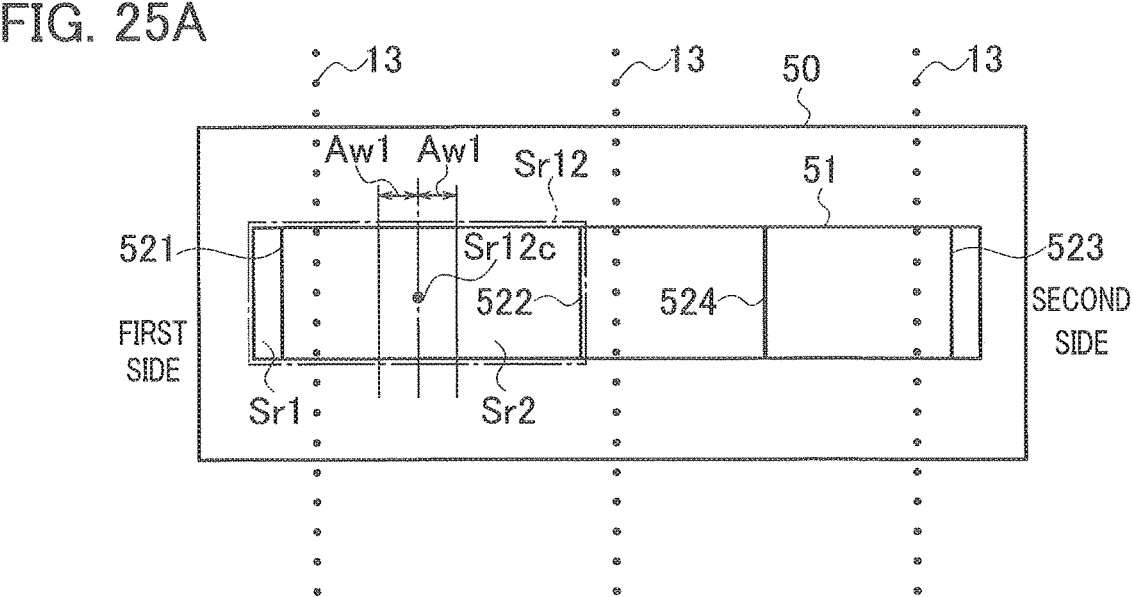
FIG. 25A is a diagram illustrating a position of a gravity center of a combination scrap of a scrap of an end portion and an adjacent scrap in a first example illustrated in FIG. 24A.
Figure 25B:
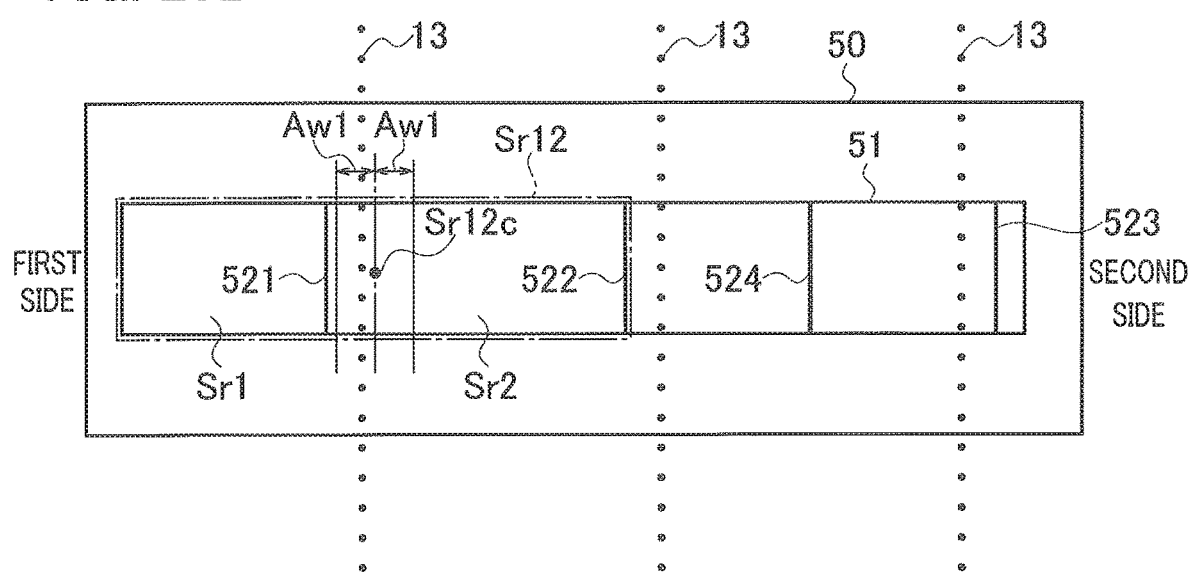
FIG. 25B is a diagram illustrating a position of a gravity center of a combination scrap of a scrap of an end portion and an adjacent scrap in a second example illustrated in FIG. 24B.

The CAM device 30, in step S4143, calculates a gravity center (a second gravity center) of a combination scrap of a scrap of an end portion and an adjacent scrap. In a case of FIG. 24A and FIG. 24B, as illustrated in FIG. 25A and FIG. 25B respectively, the CAM device 30 calculates a gravity center Sr12c of a combination scrap Sr12 of a scrap Sr1 of an end portion and an adjacent scrap Sr2.

The CAM device 30, in step S4144, determines whether a gravity center of a combination scrap is proximate to the skid 13. The CAM device 30 advances a process to step S4146 in a case where the gravity center of the combination scrap is proximate to the skid 13 (YES) and alternatively advances a process to step S4145 in a case where the gravity center of the combination scrap is not proximate to the skid 13 (NO). In FIG. 25A, the skid 13 is not positioned within the margin Aw1 from the gravity center Sr12c and the gravity center Sr12c of the combination scrap Sr12 is not proximate to the skid 13. In FIG. 25B, the skid 13 is positioned within the margin Aw1 from the gravity center Sr12c and the gravity center Sr12c of the combination scrap Sr12 is proximate to the skid 13.

Figure 26:
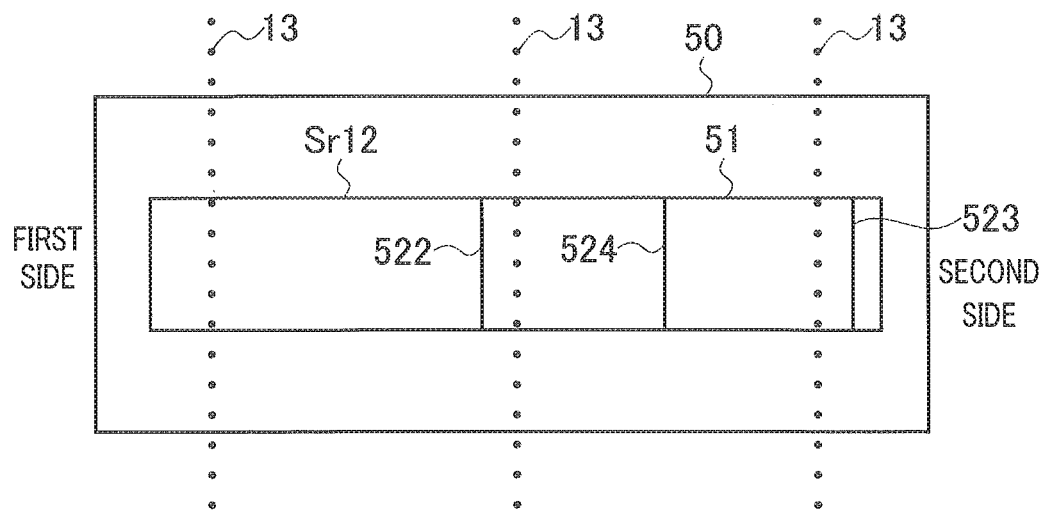
FIG. 26 is a diagram illustrating a state in which, by a dividing line optimization process, a dividing line set between a scrap of an end portion and an adjacent scrap in FIG. 25A is deleted.

The CAM device 30, in step S4145, deletes a dividing line set between a scrap of an end portion and an adjacent scrap. In a case of FIG. 25A, as illustrated in FIG. 26, the CAM device 30 deletes the dividing line 521.

Figure 27:
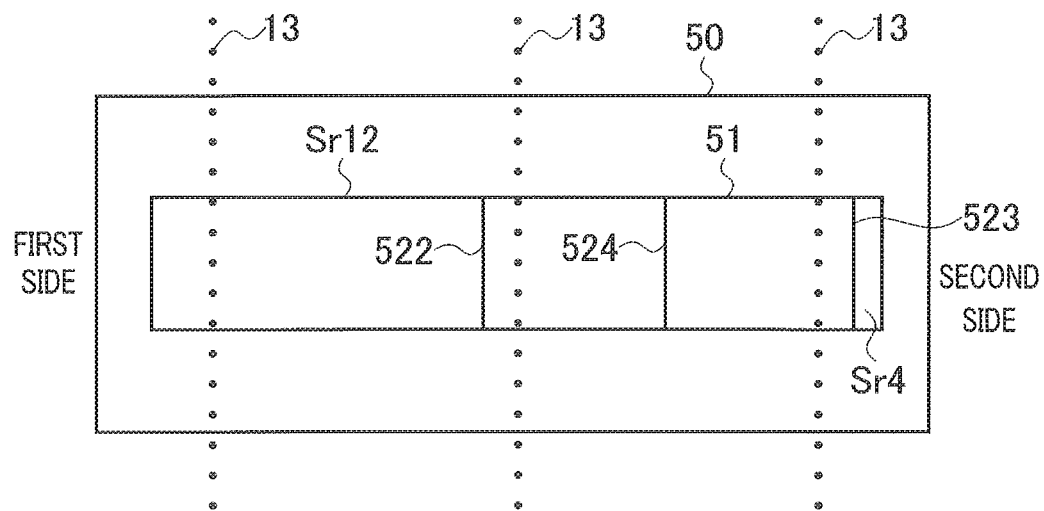
FIG. 27 is a diagram illustrating a state in which a scrap of an end portion on a second side is set as a determining target.

Following step S4145 or by shifting from step S4142, in step S4146, the CAM device 30 sets a scrap of an end portion on a second side as a determining target. As illustrated in FIG. 27, the CAM device 30 sets a scrap Sr4 of the end portion on the second side as a determining target. The CAM device 30, in step S4147, determines whether the optimization of the dividing line at the end portions on the first and second sides has been completed. In this case, the optimization of the dividing line at the end portion on the second side has not been completed, and thus, the CAM device 30 determines that the optimization has not been completed (NO) and returns a process to step S4142.

Figure 28:
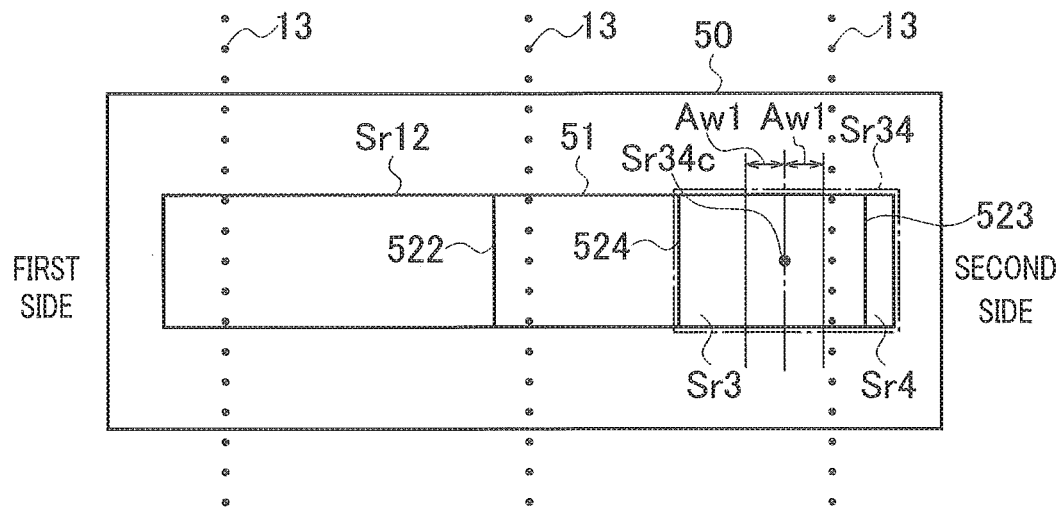
FIG. 28 is a diagram illustrating a position of a gravity center of a combination scrap of a scrap of an end portion and an adjacent scrap in FIG. 27.

The CAM device 30, in step S4143, as illustrated in FIG. 28, calculates a gravity center Sr34c of a combination scrap Sr34 of a scrap Sr4 of an end portion and an adjacent scrap Sr3. In FIG. 28, the skid 13 is not positioned within the margin Aw1 from the gravity center Sr34c and the gravity center Sr12c of the combination scrap Sr34 is not proximate to the skid 13.

Figure 29:
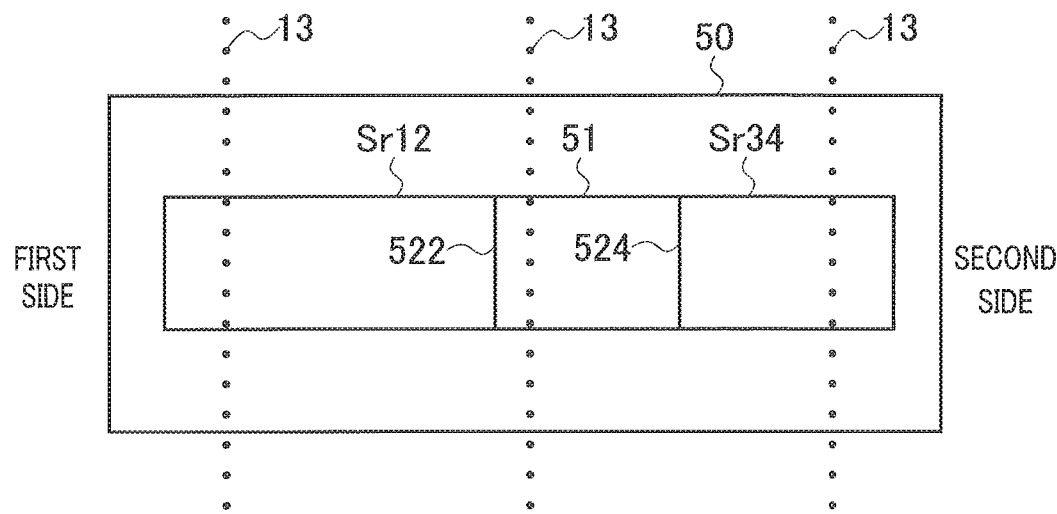
FIG. 29 is a diagram illustrating a state in which, by a dividing line optimization process, a dividing line set between a scrap of an end portion and an adjacent scrap in FIG. 28 is deleted.

Therefore, the CAM device 30, in step S4145, as illustrated in FIG. 29, deletes the dividing line 523 set between the scrap Sr4 of the end portion and the adjacent scrap Sr3. The CAM device 30, in step S4147, determines that the optimizations of the dividing lines at the end portions on the first and second sides have been completed (YES) and causes the processes to be ended.

In FIG. 23, in step S4141, the scrap of the end portion on the second side may be set as the determining target and in step S4146, the scrap of the end portion on the first side may be set as the determining target.

Figure 30:
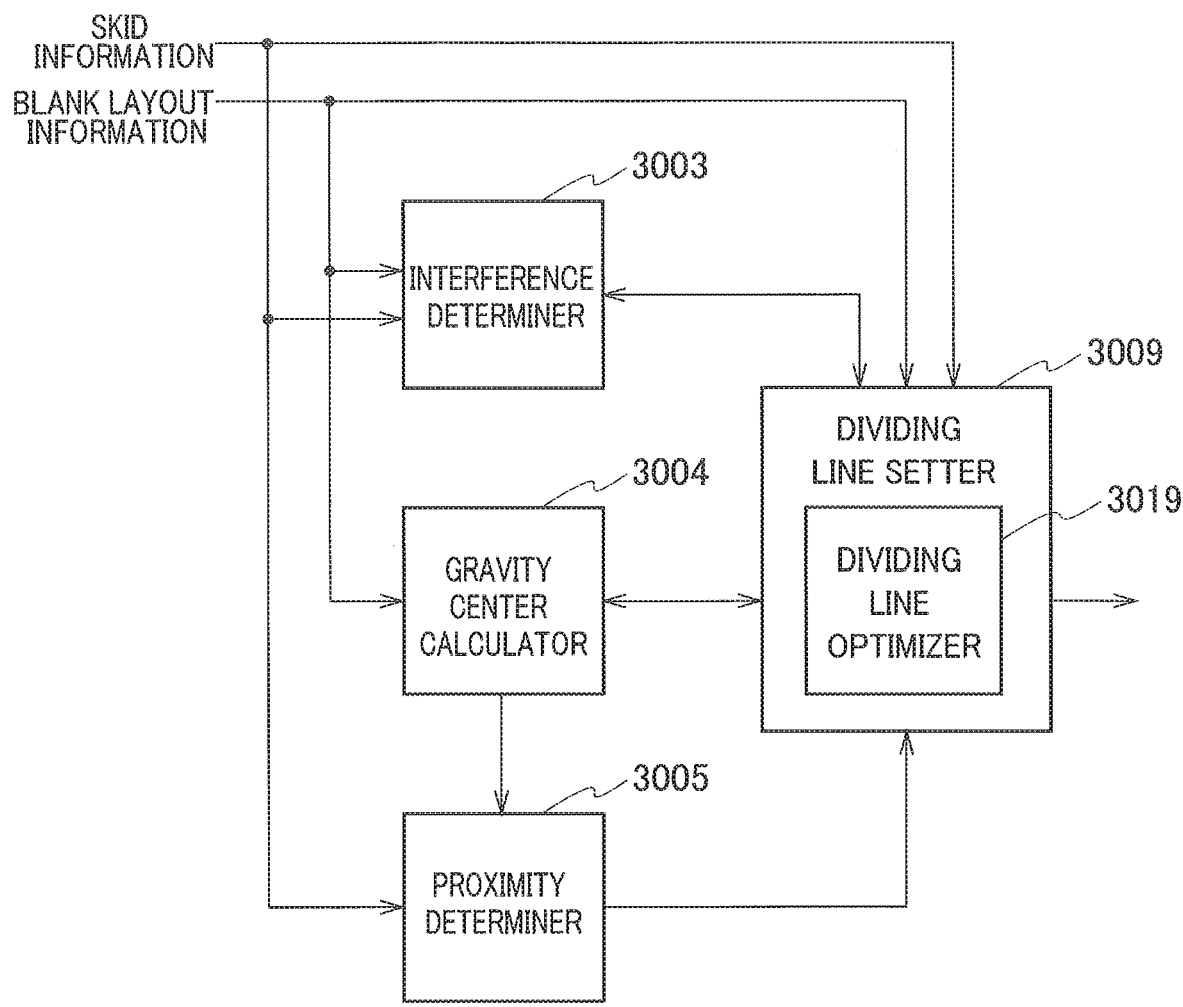
FIG. 30 is a partial block diagram illustrating an example of functional configurations in a case where the CAM performs a dividing line optimization process.

In a case of providing a dividing line optimization process of step S414 illustrated in FIG. 22, it is sufficient if the CAM device 30 has functional configurations as illustrated in FIG. 30. Components in FIG. 30 that are the same as those in FIG. 21 are denoted with the same reference numerals. The interference determiner 3003 receives setting information on the dividing line set by the dividing line setter 3009. The interference determiner 3003 performs the process of step S4142 illustrated in FIG. 23. The gravity center calculator 3004 performs the process of step S4143 illustrated in FIG. 23. The proximity determiner 3005 performs the process of step S4144 illustrated in FIG. 23.

The dividing line setter 3009 includes a dividing line optimizer 3019. The dividing line optimizer 3019 performs the process of step S4145 illustrated in FIG. 23. In a case where the proximity determiner 3005 determines that the gravity center of the combination scrap is not proximate to the skid 13, the dividing line optimizer 3019 deletes the dividing line and optimizes the dividing line. By the processes illustrated in FIG. 23 and by the constitutions illustrated in FIG. 30, among the dividing lines set once, the number of dividing lines can be reduced by deleting dividing lines that are not necessarily required.

The laser processing machine 100 according to the present embodiment cuts the plurality of parts 50 out of the sheet metal W based on the NC data generated as above, and thus, the possibility of falling of a scrap from between the skids 13 can be increased, and a degree of abrasion of the skid 13 can be reduced. The laser processing machine 100 according to the present embodiment can solve all of or reduce problems of a conventional laser processing machine that sets a dividing line without considering a position of the skid 13 and divides the opening forming area 51 into equal parts.

Figure 31:
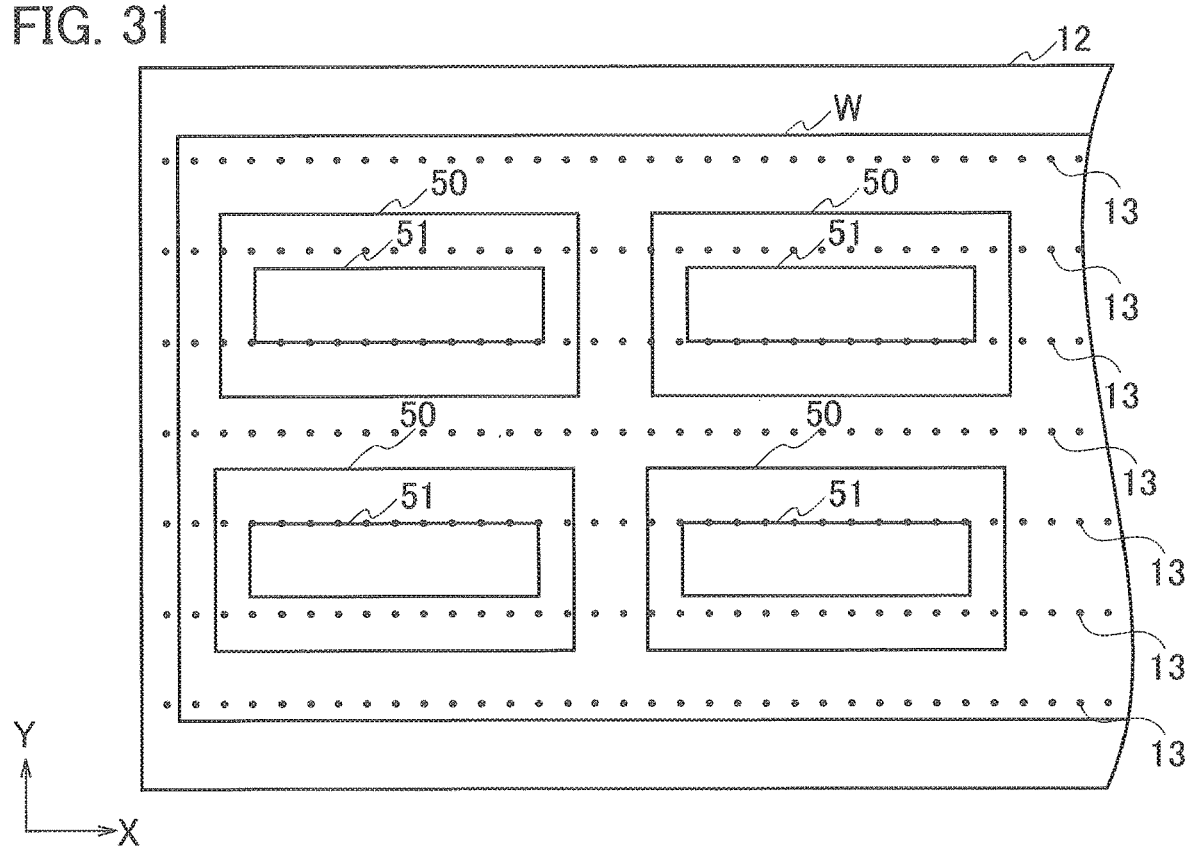
FIG. 31 is a schematic view illustrating another example of an alignment direction of skids.
Figure 32:
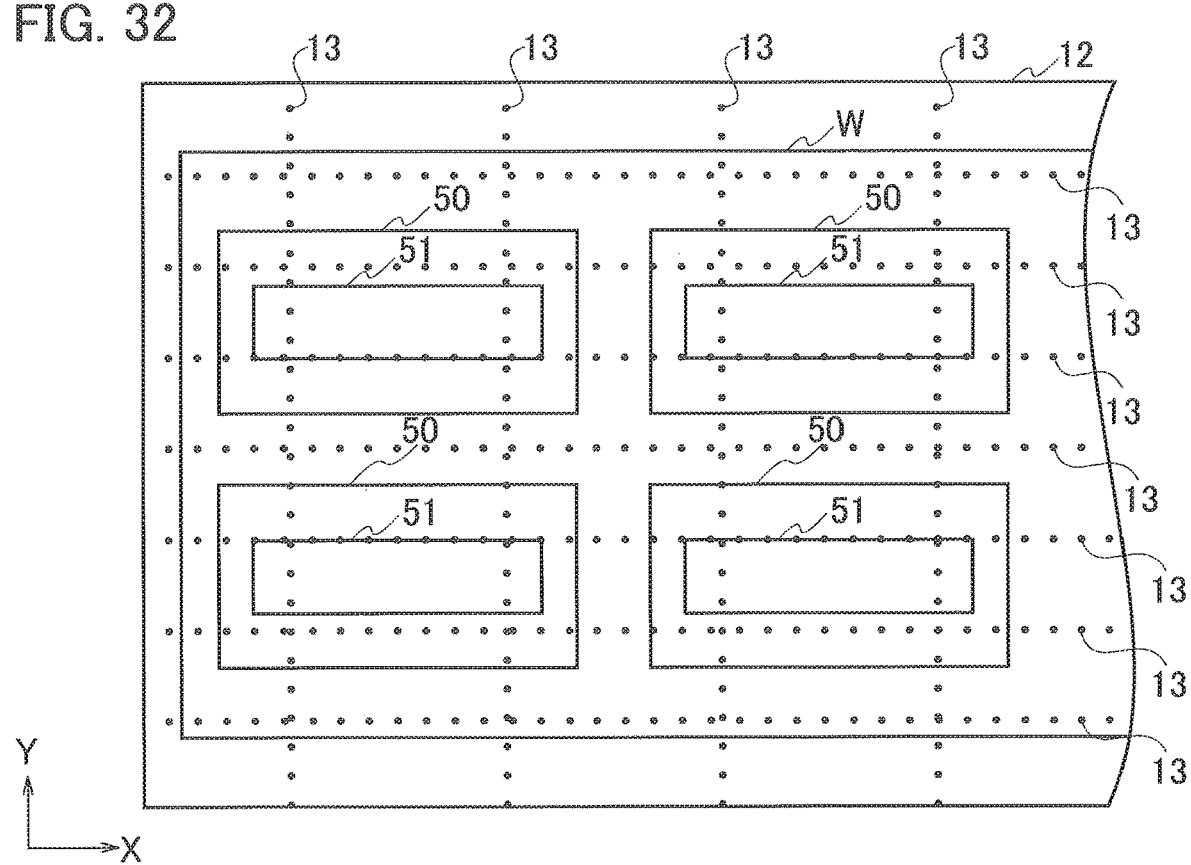
FIG. 32 is a schematic view illustrating an example in which skids are aligned in a lattice form.

The present invention is not limited to the present embodiment described above, and various modifications are possible within a scope not departing from a scope of the present invention. As illustrated in FIG. 31, the skids 13 may be arranged in a direction (a Y-direction) perpendicular to the alignment direction illustrated in FIG. 1. In this case, the both end portions of the part 50 in the Y-direction are the first side and the second side respectively. As illustrated in FIG. 32, the skids 13 may be arranged in a lattice form. In this case, in each of the X-direction and the Y-direction, the processes illustrated in FIG. 5 may be performed.

According to the present embodiment, a case where the CAM device 30 generates NC data for cutting a part formed with an opening therein out of the sheet metal W and the laser processing machine 100 cuts the part formed with the opening therein out of the sheet metal W is taken as an example. Alternatively, the CAM device 30 may generate NC data for forming an opening inside of the sheet metal W and the laser processing machine 100 may cut the sheet metal W so as to form an opening inside of the sheet metal W. Even in such a case, in a case where an opening forming area interferes with a skid, a dividing line can be set by considering a position of the skid and a scrap can be divided in a manner that the scrap can easily fall off.

The disclosure of the present application is related to the subject matter described in Japanese Patent Application No. 2018-061658 filed on Mar. 28, 2018, the entire disclosures of which are incorporated herein by reference.

The invention claimed is:

1. A laser processing machine comprising:
    a processing machine body comprising a table in which a plurality of skids are aligned and is configured to cut a material by irradiating the material placed on the skids with a laser beam; and
    a control device configured to control the processing machine body such that an opening is formed by cutting the periphery of an opening forming area set at an inside of a art that is cut from the material; wherein
    a single skid interferes with the opening forming area and the interfering skid is positioned within a predetermined margin from a first gravity center of the opening forming area in an alignment direction of the plurality of skids;
    the control device controls the processing machine body such that the opening forming area is cut with a dividing line that is located in the opening forming area set at a position that is apart from the single skid by a predetermined distance in the alignment direction;
    the predetermined distance is a distance in which the material is not welded to the single skid as a result of the opening forming area being cut with the dividing line; and
    the predetermined distance is a distance in which, among a plurality of scraps that should be removed from the part formed by cutting the opening forming area with the dividing line and by cutting the periphery of the opening forming area, a scrap interfering with the single skid being defined as a first scrap, and a scrap not interfering with the single skid being defined as a second scrap, a second gravity center of the first scrap is positioned at a distance longer than the margin from the single skid, thereby increasing a possibility of falling off of the first scrap from between the skids.

2. The laser processing machine according to claim 1, wherein the control device controls the processing machine body such that the opening forming area is cut with a dividing line set at a position that is apart by the predetermined distance from the single skid on a side opposite to the first gravity center across the skid.

3. A laser processing machine comprising:
    a processing machine body comprising a table in which a plurality of skids are aligned and is configured to cut a material by irradiating the material placed on the skids with a laser beam; and
    an NC device configured to control the processing machine body such that an opening is formed by cutting the periphery of an opening forming area set at an inside of a part that is cut from the material; wherein
    a single skid interferes with the opening forming area and the interfering skid is positioned within a predetermined margin from a first gravity center of the opening forming area in an alignment direction of the plurality of skids;
    the NC device controls the processing machine body such that the opening forming area is cut with a dividing line that is located in the opening forming area set at a position that is apart from the single skid by a predetermined distance in the alignment direction;
    the predetermined distance is a distance in which the material is not welded to the single skid as a result of the opening forming area being cut with the dividing line; and
    the predetermined distance is a distance in which, among a plurality of scraps that should be removed from the part formed by cutting the opening forming area with the dividing line and by cutting the periphery of the opening forming area, a scrap interfering with the single skid being defined as a first scrap, and a scrap not interfering with the single skid being defined as a second scrap, a second gravity center of the first scrap is positioned at a distance longer than the margin from the single skid, thereby increasing a possibility of falling off of the first scrap from between the skids.

4. The laser processing machine according to claim 1, wherein the NC device controls the processing machine body such that the opening forming area is cut with a dividing line set at a position that is apart by the predetermined distance from the single skid on a side opposite to the first gravity center across the single skid.

* * * * *